(12) United States Patent
Choi et al.

(10) Patent No.: US 12,399,594 B2
(45) Date of Patent: Aug. 26, 2025

(54) TOUCH SENSING UNIT AND DISPLAY DEVICE INCLUDING THE SAME

(71) Applicant: SAMSUNG DISPLAY CO., LTD., Yongin-si (KR)

(72) Inventors: Sang Hyun Choi, Seoul (KR); Yong Hwan Park, Hwaseong-si (KR); Kwang Soo Bae, Yongin-si (KR); Chaun Gi Choi, Suwon-si (KR); Sang Hyun Han, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/765,748

(22) Filed: Jul. 8, 2024

(65) Prior Publication Data

US 2024/0361870 A1    Oct. 31, 2024

Related U.S. Application Data

(60) Continuation of application No. 18/108,220, filed on Feb. 10, 2023, now Pat. No. 12,032,795, which is a division of application No. 17/697,073, filed on Mar. 17, 2022, now Pat. No. 11,579,739.

(30) Foreign Application Priority Data

Aug. 3, 2021  (KR) .................. 10-2021-0101981

(51) Int. Cl.
    *G06F 3/044*   (2006.01)
    *G06F 3/041*   (2006.01)
(52) U.S. Cl.
    CPC .......... *G06F 3/0446* (2019.05); *G06F 3/0412* (2013.01)

(58) Field of Classification Search
    CPC ......... G06F 3/0443; G06F 2203/04102; G06F 2203/04103; G06F 2203/04111; G06F 3/0412; G06F 3/04164; G06F 3/0446; G06F 3/0448; G09G 2380/02; G09G 3/035; G09G 2300/0426; G09G 2354/00
    See application file for complete search history.

(56) References Cited

U.S. PATENT DOCUMENTS

| | | |
|---|---|---|
| 10,871,840 B2 | 12/2020 | Baek |
| 10,873,043 B2 | 12/2020 | Jin |
| 11,579,739 B1 | 2/2023 | Choi et al. |
| 2015/0277655 A1 | 10/2015 | Kim |
| 2016/0041666 A1 | 2/2016 | Lee et al. |
| 2017/0192574 A1 | 7/2017 | Koike et al. |
| 2018/0081473 A1* | 3/2018 | Seo .................. G06F 1/3218 |

(Continued)

FOREIGN PATENT DOCUMENTS

| | | |
|---|---|---|
| KR | 10-2020-0143628 | 2/2020 |
| KR | 10-2022-0070143 | 5/2022 |

*Primary Examiner* — Robin J Mishler
(74) *Attorney, Agent, or Firm* — F. CHAU & ASSOCIATES, LLC

(57) ABSTRACT

A touch sensing device includes first sensor electrodes disposed in a first area, second sensor electrodes disposed in a second area, first sensor lines each connected to the first sensor electrodes in the first area, and second sensor lines each connected to the second sensor electrodes in the second area. Each of the second sensor lines includes a first sub-sensor line disposed in the second area, and a second sub-sensor line disposed in the first area and the second area and connected to the first sub-sensor line.

20 Claims, 26 Drawing Sheets

(56) References Cited

U.S. PATENT DOCUMENTS

| | | |
|---|---|---|
| 2018/0157361 A1 | 6/2018 | Kim |
| 2019/0196643 A1* | 6/2019 | Chung ................. G02F 1/13338 |
| 2019/0332224 A1* | 10/2019 | Bok ...................... G06F 3/0448 |
| 2020/0026384 A1* | 1/2020 | Rhe ...................... G06F 3/0443 |
| 2020/0258969 A1 | 8/2020 | Yi et al. |
| 2020/0371549 A1 | 11/2020 | Park et al. |
| 2021/0117031 A1 | 4/2021 | Tominaga et al. |
| 2022/0164070 A1 | 5/2022 | Kim et al. |
| 2022/0236817 A1 | 7/2022 | Kida et al. |
| 2023/0038020 A1 | 2/2023 | Choi et al. |
| 2023/0195270 A1 | 6/2023 | Choi et al. |

* cited by examiner

FIG. 22
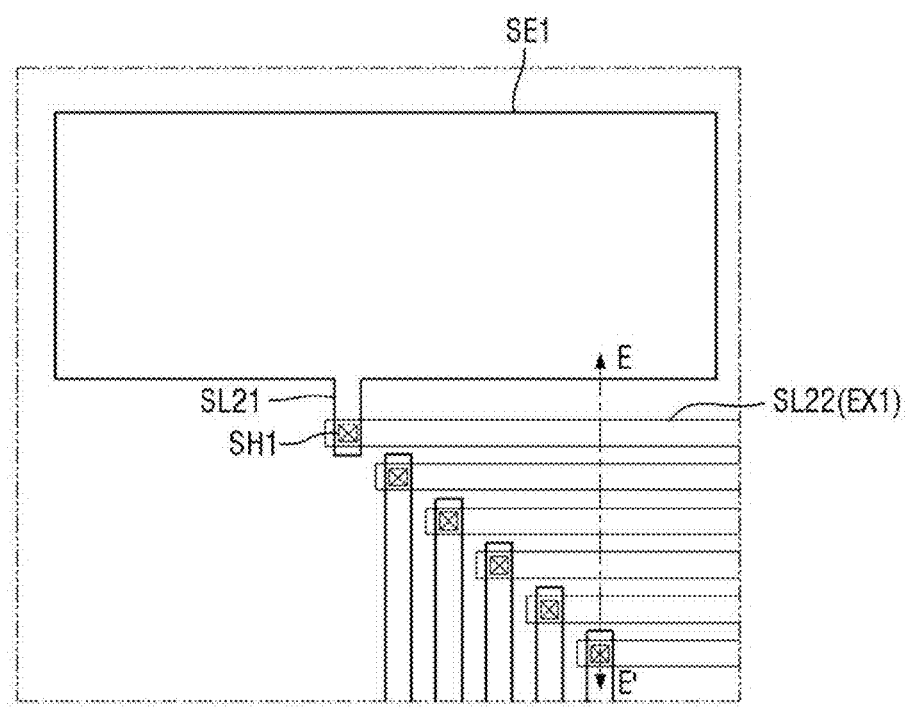
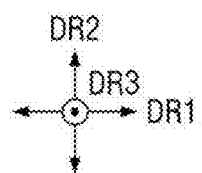

TOUCH SENSING UNIT AND DISPLAY DEVICE INCLUDING THE SAME

CROSS-REFERENCE TO RELATED APPLICATIONS

This U.S. non-provisional patent application is continuation of U.S. patent application Ser. No. 18/108,220 filed on Feb. 10, 2023, which is a divisional of U.S. patent application Ser. No. 17/697,073 filed on Mar. 17, 2022, which claims priority under 35 U.S.C. § 119 to Korean Patent Application No. 10-2021-0101981, filed on Aug. 3, 2021, the disclosures of which are incorporated by reference in their entireties herein.

1. TECHNICAL FIELD

Embodiments of the present disclosure relate to a touch sensing unit and a display device including the same.

2. DISCUSSION OF RELATED ART

As the information society develops, the demand for display devices for displaying images has increased and diversified. For example, display devices have been applied to various electronic devices such as smartphones, digital cameras, laptop computers, navigation devices, and smart televisions.

The display device may include a touch sensing unit for sensing a user's touch. The touch sensing unit may include a plurality of touch electrodes driven in a capacitance manner for sensing the user's touch. The capacitance manner includes a mutual capacitance manner of sensing a change in mutual capacitance between two types of touch electrodes and a self-capacitance manner of sensing a change in self-capacitance of one type of touch electrode. Since the mutual capacitance manner has difficulty in increasing touch sensitivity due to a resistance-capacitance (RC) load, it is difficult to apply the mutual capacitance manner to a display device for a tablet personal computer (PC) or a monitor. Therefore, the self-capacitance manner has been mainly applied to the display device for the tablet PC or the monitor.

A non-display area (or a bezel area) excluding the display area can be minimized to widen a display area for displaying an image. However, when the self-capacitance manner is applied to the display device for the tablet PC or the monitor, an area of the non-display area (or the bezel area) may increase due to an increase in the number of touch lines connected to the plurality of touch electrodes.

SUMMARY

Aspects of the present disclosure provide a touch sensing unit capable of preventing an increase in an area of a non-display area, and a display device including the same.

According to an embodiment of the present disclosure, a touch sensing device includes a plurality of first sensor electrodes disposed in a first area, a plurality of second sensor electrodes disposed in a second area, a plurality of first sensor lines each connected to the first sensor electrodes in the first area, and second sensor lines each connected to the second sensor electrodes in the second area. Each of the plurality of second sensor lines includes a first sub-sensor line disposed in the second area, and a second sub-sensor line disposed in the first area and the second area and connected to the first sub-sensor line.

In an embodiment, the second sub-sensor line may extend in a first direction in the second area.

In an embodiment, the plurality of first sensor lines and the first sub-sensor line may extend in a second direction intersecting the first direction.

In an embodiment, the second sub-sensor line may intersect at least one of the plurality of first sensor lines in the first area.

In an embodiment, the second sub-sensor line may be disposed at a different layer from the plurality of first sensor electrodes, the plurality of second sensor electrodes, the plurality of first sensor lines, and the first sub-sensor line.

In an embodiment, the touch sensing device may further include a first insulating film disposed on the second sub-sensor line. The plurality of first sensor electrodes, the plurality of second sensor electrodes, the plurality of first sensor lines, and the first sub-sensor line may be disposed on the first insulating film.

In an embodiment, the second sub-sensor line may be connected to the second sub-sensor line through a contact hole penetrating through the first insulating film in the second area.

In an embodiment, each of the plurality of first sensor electrodes and the plurality of second sensor electrodes may have a smaller length in the first direction than in the second direction.

In an embodiment, the second sub-sensor line may overlap at least one of the plurality of second sensor electrodes in the second area.

In an embodiment, a second sub-sensor line of any one of the plurality of second sensor lines may intersect a first sub-sensor line of another second sensor line of the plurality of second sensor lines in the second area.

In an embodiment, the second sub-sensor line may include a first extending portion disposed in the first area and extending in the second direction, a second extending portion disposed in the first area and the second area and extending in the first direction, and a curved portion disposed in the first area and disposed between the first extending portion and the second extending portion.

In an embodiment, a width of the second extending portion may be greater than a width of the first extending portion.

In an embodiment, the curved portion may overlap any one of the plurality of first sensor electrodes.

In an embodiment, the second sub-sensor line does not overlap the plurality of second sensor electrodes in the second area.

In an embodiment, each of the plurality of first sensor electrodes and the plurality of second sensor electrodes may have a greater length in a first direction than in a second direction intersecting the first direction.

In an embodiment, the second sub-sensor line may include a first extending portion disposed in the first area and extending in the second direction, a second extending portion disposed in the first area and the second area and extending in the first direction, and a curved portion disposed in the first area and disposed between the first extending portion and the second extending portion.

In an embodiment, a width of the first extending portion may be greater than a width of the second extending portion.

In an embodiment, the curved portion does not overlap any one of the plurality of first sensor electrodes.

According to an embodiment of the present disclosure, a touch sensing device includes a first sensor electrode and a second sensor electrode, a multiplexer electrically connected to the first sensor electrode and the second sensor electrode, a first sensor line disposed between the first sensor electrode and the multiplexer, a first sub-sensor line connected to the second sensor electrode, and a second sub-sensor line connected to the first sub-sensor line and electrically separated from the first sensor line.

In an embodiment, the second sub-sensor line may be disposed at a different layer from the first sensor electrode, the second sensor electrode, the first sensor line, and the first sub-sensor line.

According to an embodiment of the present disclosure, a display device includes a main area, a first auxiliary area disposed on a first side of the main area and protruding from the main area in a first direction, a sub-area disposed on a second side of the main area and protruding from the main area in a second direction intersecting the first direction, and a first roller disposed under the first auxiliary area. The first roller is configured to move in the first direction, and have a rotation axis in the second direction. In a first state, a portion of the first auxiliary area may be bent downward with respect to the main area to overlap the main area. In a second state, the first auxiliary area does not overlap the main area.

In an embodiment, when the first roller is rotated in a first rotation direction and moves to one side in the first direction, the display device may be switched from the first state to the second state. When the first roller is rotated in a second rotation direction and moves to the other side in the first direction, the display device may be switched from the second state to the first state.

In an embodiment, the display device may further include a plurality of first sensor electrodes disposed in the main area, a plurality of second sensor electrodes disposed in the first auxiliary area, a plurality of first sensor lines each connected to the first sensor electrodes in the main area, a plurality of second sensor lines each connected to the second sensor electrodes in the first auxiliary area, and a first multiplexer disposed in the sub-area and connected to the plurality of first sensor lines and the plurality of second sensor lines.

In an embodiment, each of the second sensor lines may include a first sub-sensor line disposed in the first auxiliary area, and a second sub-sensor line disposed in the main area and the first auxiliary area and connected to the first sub-sensor line.

In an embodiment, the display device may further include a second auxiliary area disposed on a second side of the main area and protruding from the main area in the first direction, and a second roller disposed under the second auxiliary area. The second roller may be configured to move in the first direction, and have a rotation axis in the second direction. In the first state, a portion of the second auxiliary area is bent downward with respect to the main area to overlap the main area. In the second state, the second auxiliary area does not overlap the main area.

In an embodiment, when the second roller is rotated in a second rotation direction and moves to the other side in the first direction, the display device is switched from the first state to the second state. When the second roller is rotated in a first rotation direction and moves to one side in the first direction, the display device may be switched from the second state to the first state.

BRIEF DESCRIPTION OF THE DRAWINGS

The present disclosure will become more apparent by describing in detail embodiments thereof, with reference to the accompanying drawings, in which:

FIG. 22 is a layout diagram illustrating a second sensor electrode, first sub-sensor lines, and second sub-sensor lines disposed in the first row and the first column of FIG. 21 in detail;

DETAILED DESCRIPTION OF THE EMBODIMENTS

Figure 1:
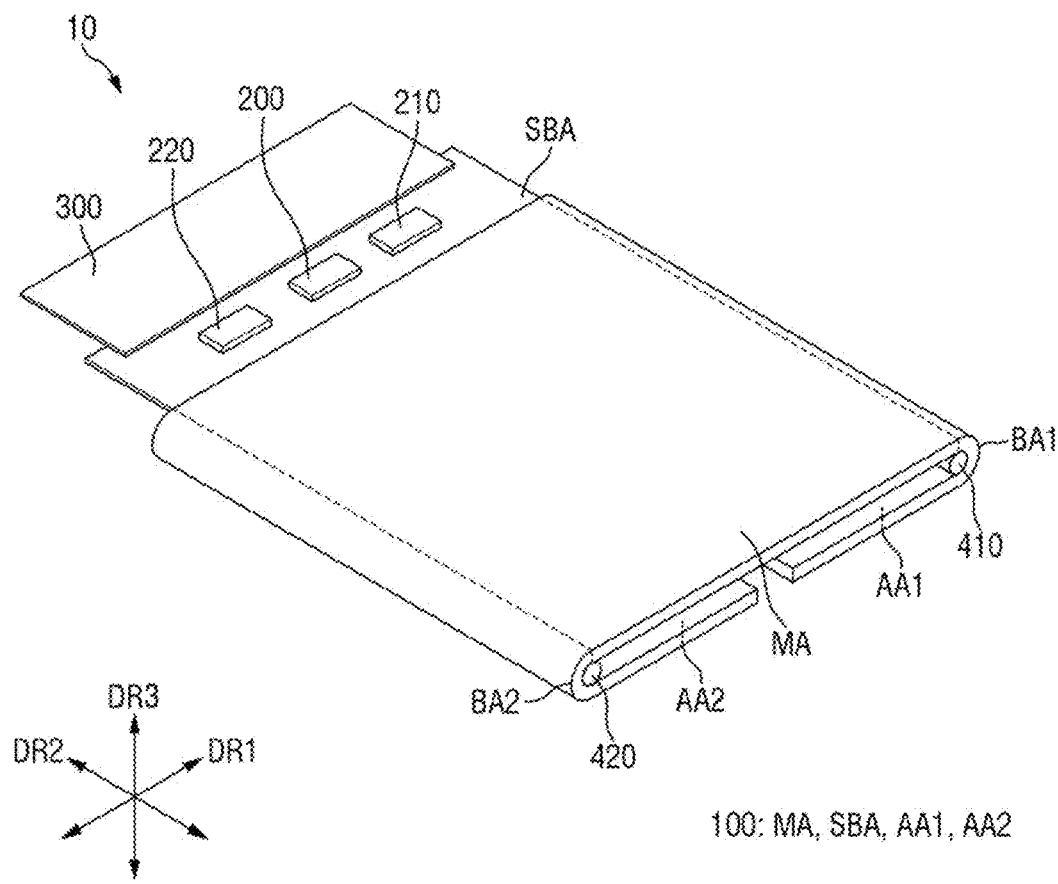
FIGS. 1 and 2 are perspective views illustrating a display device according to an embodiment.

Embodiments of the present disclosure will be described more fully hereinafter with reference to the accompanying drawings. Like reference numerals may refer to like elements throughout the specification and the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationship between components should be interpreted in a like fashion.

It will be understood that when a component, such as a film, a region, a layer, or an element, is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words use to describe the relationship between elements may be interpreted in a like fashion.

It will be further understood that descriptions of features or aspects within each embodiment are available for other similar features or aspects in other embodiments, unless the context clearly indicates otherwise. Accordingly, all features and structures described herein may be mixed and matched in any desirable manner.

As used herein, the singular forms "a", "an" and "the" are intended to include the plural forms as well, unless the context clearly indicates otherwise.

Spatially relative terms, such as "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" other elements or features would then be oriented "above" the other elements or features. Thus, the term "below" may encompass both an orientation of above and below.

When a feature is said to extend, protrude, or otherwise follow a certain direction, it will be understood that the feature may follow said direction in the negative, i.e., opposite direction. Accordingly, the feature is not limited to follow exactly one direction, and may follow along an axis formed by the direction, unless the context clearly indicates otherwise.

Figure 2:
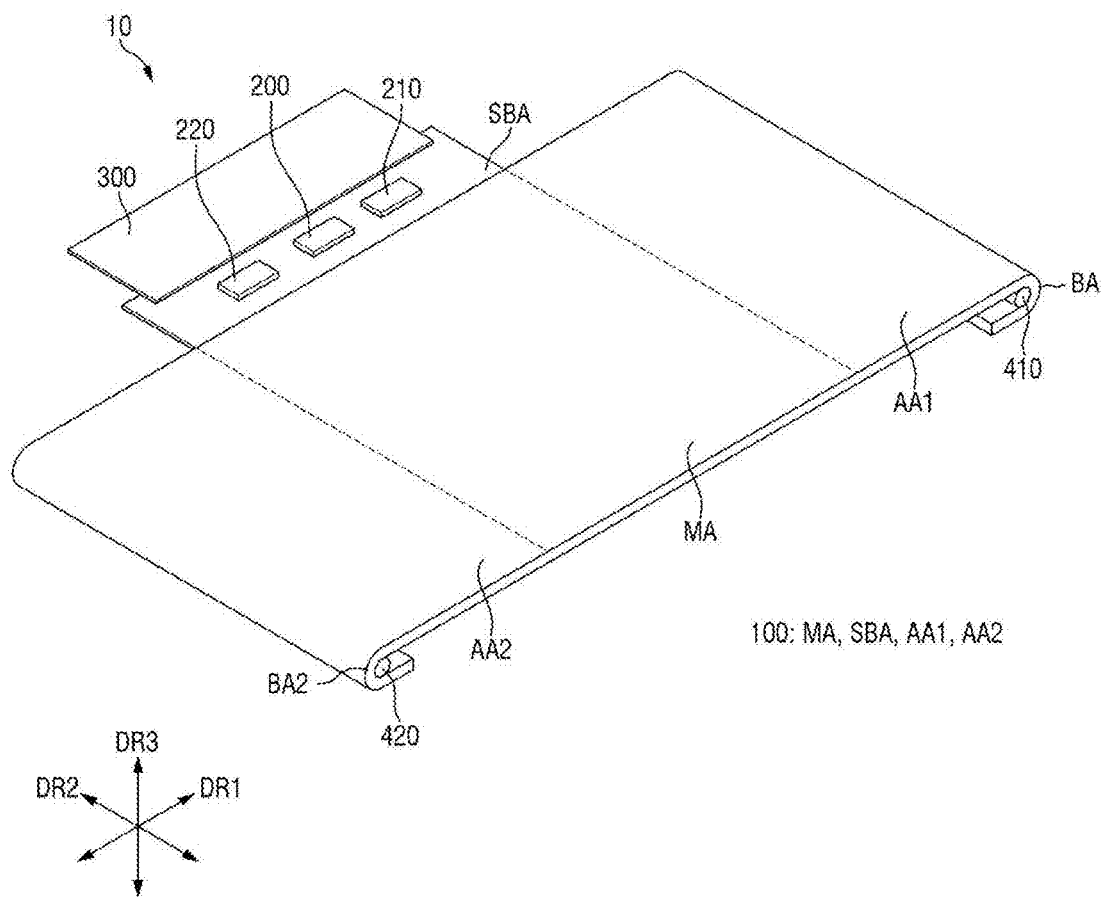

FIGS. 1 and 2 are perspective views illustrating a display device according to an embodiment. FIG. 1 is a perspective view illustrating a first state of a display device 10, and FIG. 2 is a perspective view illustrating a second state of the display device 10.

Referring to FIGS. 1 and 2, the display device 10 may be applied to portable electronic devices such as mobile phones, smartphones, tablet personal computers (PCs), mobile communication terminals, electronic notebooks, electronic books, portable multimedia players (PMPs), navigation devices, and ultra mobile PCs (UMPCs). Alternatively, the display device 10 may be applied to a display unit of televisions, laptop computers, monitors, billboards, or the Internet of Things (IOTs). Alternatively, the display device 10 may be applied to wearable devices such as smart watches, watch phones, glasses-type displays, and head mounted displays (HMDs).

The display device 10 may be a light emitting display device such as an organic light emitting display device using an organic light emitting diode, a quantum dot light emitting display device including a quantum dot light emitting layer, an inorganic light emitting display device including an inorganic semiconductor, and a micro light emitting display device using a micro or nano light emitting diode (micro LED or nano LED). Hereinafter, it has been mainly described that the display device 10 is the organic light emitting display device, but the present disclosure is not limited thereto.

The display device 10 may include a display panel 100, a display driver 200, a first multiplexer 210, a second multiplexer 220, a circuit board 300, a first roller 410, and a second roller 420.

The display panel 100 may be a flexible display panel that is bent by the first roller 410 and the second roller 420. The display panel 100 may include a main area MA, a sub-area SBA, a first auxiliary area AA1, and a second auxiliary area AA2.

In FIGS. 1 and 2, a first direction DR1 refers to a transverse direction of a display panel 100, a second direction DR2 refers to a longitudinal direction of the display panel 100, and a third direction DR3 refers to a thickness direction of the display panel 100. In this case, "left", "right", "upper", and "lower" refer to directions when the display panel 100 is viewed in a plan view. For example, "right side" refers to one side in the first direction DR1, "left side" refers to the other side in the first direction DR1, "upper side" refers to one side in the second direction DR2, and "lower side" refers to the other side in the second direction DR2. In addition, "upper portion" refers to one side in the third direction DR3, and "lower portion" refers to the other side in the third direction DR3.

The main area MA may be a flat area that is not bent, but is not limited thereto. The main area MA may have a rectangular shape in a plan view, but is not limited thereto. A length of the main area MA in the first direction DR1 may be greater than a length of the main area MA in the second direction DR2.

The sub-area SBA may be disposed on one side of the main area MA in the second direction DR2. That is, the sub-area SBA may extend from the main area MA in the second direction DR2.

The sub-area SBA may be an area that is bent. When the sub-area SBA is bent, the sub-area SBA may overlap the main area MA in the third direction DR3. The sub-area SBA may have a rectangular shape in a plan view, but is not limited thereto.

A length of the sub-area SBA in the first direction DR1 may be substantially the same as the length of the main area MA in the first direction DR1. Alternatively, a length of the sub-area SBA in the first direction DR1 may be smaller than the length of the main area MA in the first direction DR1. A length of the sub-area SBA in the second direction DR2 may be smaller than the length of the main area MA in the second direction DR2.

The sub-area SBA may include a pad portion PDA (e.g., see FIG. 4) connected to the circuit board 300. Alternatively, the sub-area SBA may be omitted, and in this case, the pad portion PDA may be disposed in the main area MA.

The first auxiliary area AA1 may be disposed on one side of the main area MA in the first direction DR1. That is, the first auxiliary area AA1 may extend from the main area MA in the first direction DR1.

The second auxiliary area AA2 may be disposed on the other side of the main area MA in the first direction DR1. That is, the second auxiliary area AA2 may extend from the main area MA in the first direction DR1.

The first auxiliary area AA1 and the second auxiliary area AA2 may be areas that are bent. The first auxiliary area AA1 may be bent along the first roller 410. The second auxiliary area AA2 may be bent along the second roller 420.

Each of a length of the first auxiliary area AA1 in the first direction DR1 and a length of the second auxiliary area AA2 in the first direction DR1 may be smaller than the length of the main area MA in the first direction DR1. Each of a length of the first auxiliary area AA1 in the second direction DR2 and a length of the second auxiliary area AA2 in the second direction DR2 may be substantially the same as the length of the main area MA in the second direction DR2.

The display driver 200 may output signals and voltages for driving the display panel 100. For example, the display driver 200 may output data voltages to data lines of the display panel 100 and output a source voltage to a power line of the display panel 100.

The display driver 200 may be formed as an integrated circuit (IC) and be adhered onto the sub-area SBA of the display panel 100 in a chip on glass (COG) manner, a chip on plastic (COP) manner, or an ultrasonic manner. Alternatively, the display driver 200 may be adhered to the circuit board 300.

Each of the first multiplexer 210 and the second multiplexer 220 may connect touch lines of the display panel 100 and pad lines connected to pads of the pad portion PDA to each other in a ratio of M:1 (here, M is an integer of 2 or more). Therefore, the number of pads of the pad portion PDA may be reduced due to the first multiplexer 210 and the second multiplexer 220.

The first multiplexer 210 and the second multiplexer 220 may be disposed in the sub-area SBA of the display panel 100. Each of the first multiplexer 210 and the second multiplexer 220 may be formed as an integrated circuit (IC) and be adhered onto the sub-area SBA of the display panel 100 in a chip on glass (COG) manner, a chip on plastic (COP) manner, or an ultrasonic manner. Alternatively, each of the first multiplexer 210 and the second multiplexer 220 may include thin film transistors. In this case, the thin film transistors of each of the first multiplexer 210 and the second multiplexer 220 may be formed in a thin film transistor layer TFTL (e.g., see FIG. 3).

The first multiplexer 210 may be disposed closer to the first auxiliary area AA1 than the second multiplexer 220 is. The second multiplexer 220 may be disposed closer to the second auxiliary area AA2 than the first multiplexer 210 is. The first multiplexer 210 may be disposed on one side of the display driver 200, and the second multiplexer 220 may be disposed on the other side of the display driver 200.

The circuit board 300 may be attached onto the pad portion of the display panel 100 using an anisotropic conductive film (ACF). The circuit board 300 may be electrically connected to the pad portion of the display panel 100. The circuit board 300 may be a flexible film such as a flexible printed circuit board, a printed circuit board, or a chip on film.

Each of the first roller 410 and the second roller 420 may extend in the second direction DR2. In addition, each of the first roller 410 and the second roller 420 may move in the first direction DR1. In addition, each of the first roller 410 and the second roller 420 has a rotation axis in the second direction DR2, and may rotate in a first rotation direction or a second rotation direction. A first rotation direction may be a clockwise direction, and a second rotation direction may be a counterclockwise direction. That is, each of the first roller 410 and the second roller 420 may move in the first direction DR1, and may rotate in the first rotation direction or the second rotation direction.

A first bending area BA1 of the first auxiliary area AA1 may move in the first direction DR1 according to the movement and the rotation of the first roller 410. A second bending area BA2 of the second auxiliary area AA2 may move in the first direction DR1 according to the movement and the rotation of the second roller 420.

When the first roller 410 moves to the right and rotates in the second rotation direction, the first bending area BA1 of the first auxiliary area AA1 may move to the right. Accordingly, the first bending area BA1 of the first auxiliary area AA1 may be disposed apart from the main area MA. Therefore, the first auxiliary area AA1 viewed from a front surface of the display device 10 may be widened.

When the second roller 420 moves to the left and rotates in the first rotation direction, the second bending area BA2 of the second auxiliary area AA2 may move to the left. Accordingly, the second bending area BA2 of the second auxiliary area AA2 may be disposed apart from the main area MA. Therefore, the second auxiliary area AA2 viewed from the front surface of the display device 10 may be widened.

That is, when the first roller 410 moves to the right and rotates in the second rotation direction and the second roller 420 moves to the left and rotates in the first rotation direction, the display device 10 may be switched from the first state to the second state.

In contrast, when the first roller 410 moves to the left and rotates in the first rotation direction, the first bending area BA1 of the first auxiliary area AA1 may move to the left. Accordingly, the first bending area BA1 of the first auxiliary area AA1 may be disposed adjacent to the main area MA. Therefore, the first auxiliary area AA1 viewed from the front surface of the display device 10 may be narrowed.

When the second roller 420 moves to the right and rotates in the second rotation direction, the second bending area BA2 of the second auxiliary area AA2 may move to the right. Accordingly, the second bending area BA2 of the second auxiliary area AA2 may be disposed adjacent to the main area MA. Therefore, the second auxiliary area AA2 viewed from the front surface of the display device 10 may be narrowed.

That is, when the first roller 410 moves to the left and rotates in the first rotation direction and the second roller 420 moves to the right and rotates in the second rotation direction, the display device 10 may be switched from the second state to the first state.

The first bending area BA1 of the first auxiliary area AA1 in the first state of the display device 10 may be disposed closer to the main area MA than the first bending area BA1 of the first auxiliary area AA1 in the second state of the display device 10 is. Therefore, in the second state of the display device 10, most of the first auxiliary area AA1 and the second auxiliary area AA2 may be viewed from the front surface of the display device 10. Therefore, in the first state of the display device 10, only a small portion of the first auxiliary area AA1 and the second auxiliary area AA2 may be viewed from the front surface of the display device 10. For example, in the first state of the display device 10, the first auxiliary area AA1 and the second auxiliary area AA2 may be viewed at right and left edges of the display device 10.

A length of the display panel 100 in the first direction DR1 in the second state of the display device 10 may be greater than a length of the display panel 100 in the first direction DR1 in the first state of the display device 10. In addition, in the second state of the display device 10, an area of the first auxiliary area AA1 that overlaps the main area MA in the third direction DR3 may be smaller than an area of the first auxiliary area AA1 that does not overlap the main area MA in the third direction DR3. In contrast, in the first state of the display device 10, an area of the first auxiliary area AA1 that overlaps the main area MA in the third direction DR3 may be greater than an area of the first auxiliary area AA1 that does not overlap the main area MA in the third direction DR3. In addition, in the second state of the display device 10, an area of the second auxiliary area AA2 that overlaps the main area MA in the third direction DR3 may be smaller than an area of the second auxiliary area AA2 that does not overlap the main area MA in the third direction DR3. In contrast, in the first state of the display device 10, an area of the second auxiliary area AA2 that overlaps the main area MA in the third direction DR3 may be greater than an area of the second auxiliary area AA2 that does not overlap the main area MA in the third direction DR3.

Since the first auxiliary area AA1 is bent according to the rotation of the first roller 410, a curvature of the first roller 410 and a curvature of the first auxiliary area AA1 may be substantially the same as each other. Since the second auxiliary area AA2 is bent according to the rotation of the second roller 420, a curvature of the second roller 420 and a curvature of the second auxiliary area AA2 may be substantially the same as each other. In addition, since the curvature of the first roller 410 and the curvature of the second roller 420 may be substantially the same as each other, the curvature of the first auxiliary area AA1 and the curvature of the second auxiliary area AA2 may be substantially the same as each other. Furthermore, when the sub-area SBA is bent, a curvature of the sub-area SBA may be different from the curvature of the first auxiliary area AA1 or the curvature of the second auxiliary area AA2 to prevent the sub-area SBA from interfering with the first and second auxiliary areas AA1 and AA2. For example, the curvature of the sub-area SBA may be smaller than the curvature of the first auxiliary area AA1 and the curvature of the second auxiliary area AA2.

As illustrated in FIGS. 1 and 2, through the first auxiliary area AA1 and the second auxiliary area AA2, a size of the display panel 100 viewed from the front surface of the display device 10, that is, a size of a display area in which an image is displayed may be adjusted in accordance with the movement of the first roller 410 and the second roller 420. Therefore, a user may change the size of the display panel 100 by adjusting a state of the display device 10 to the first state or the second state according to a use of the display device 10.

Figure 3:
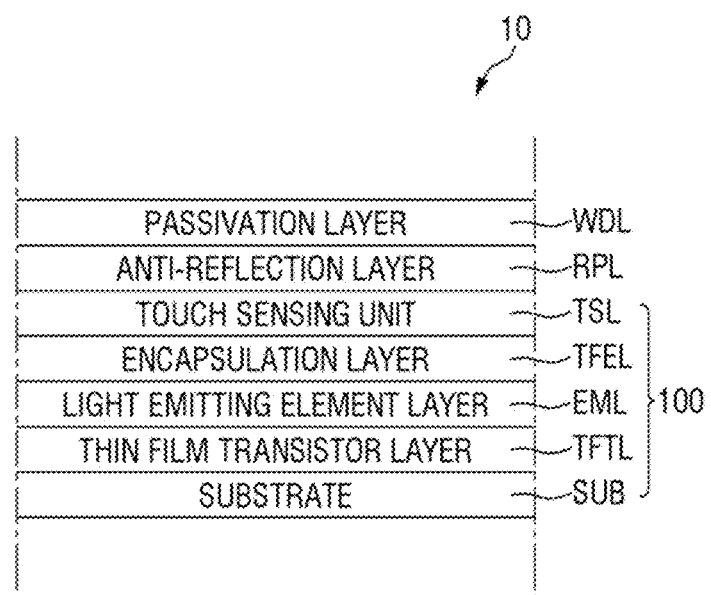
FIG. 3 is a cross-sectional view illustrating a stacked structure of the display device according to an embodiment.

FIG. 3 is a cross-sectional view illustrating a stacked structure of the display device according to an embodiment.

Referring to FIG. 3, the display device 10 according to an embodiment includes a substrate SUB, a thin film transistor layer TFTL, a light emitting element layer EML, an encapsulation layer TFEL, a touch sensing unit TSL (e.g., a touch sensor or touch sensing device), and an anti-reflection layer RPL, and a passivation layer WDL. The display panel 100 may include the substrate SUB, the thin film transistor layer TFTL, the light emitting element layer EML, and the encapsulation layer TFEL.

The substrate SUB may be made of an insulating material such as a polymer resin. For example, the substrate SUB may include polyimide. The substrate SUB may be a flexible substrate that may be bent, folded, or rolled.

The thin film transistor layer TFTL may be disposed on one surface of the substrate SUB. The thin film transistor layer TFTL may include a plurality of thin film transistors for driving light emitting elements of the light emitting element layer EML.

The light emitting element layer EML may be disposed on one surface of the thin film transistor layer TFTL. The light emitting element layer EML may include light emitting elements that emit light. Each of the light emitting elements may emit light with a predetermined luminance according to an anode voltage and a cathode voltage applied from the thin film transistor layer TFTL.

Each of the light emitting elements may be an organic light emitting diode including an anode electrode, a cathode electrode, and an organic light emitting layer disposed between the anode electrode and the cathode electrode. Alternatively, each of the light emitting elements may be an inorganic light emitting element including an anode electrode, a cathode electrode, and an inorganic semiconductor disposed between the anode electrode and the cathode electrode. Alternatively, each of the light emitting elements may be a quantum dot light emitting element including an anode electrode, a cathode electrode, and a quantum dot light emitting layer disposed between the anode electrode and the cathode electrode. Alternatively, each of the light emitting elements may be a micro light emitting diode.

The encapsulation layer TFEL may be disposed on one surface of the light emitting element layer EML. The encapsulation layer TFEL may include at least one inorganic film or at least one inorganic film and at least one organic film. Alternatively, the encapsulation layer TFEL may be a glass substrate or an encapsulation film.

The touch sensing unit TSL may be disposed on one surface of the encapsulation layer TFEL. The touch sensing unit TSL may include a plurality of sensor electrodes SE to sense a touch input.

The anti-reflection layer RPL may be disposed on one surface of the touch sensing unit TSL. The anti-reflection layer RPL may serve to prevent deterioration of image visibility of the display panel 100 due to reflection of external light. The anti-reflection layer RPL may include a linear polarizing plate and a retardation film such as a λ/4 plate (quarter-wave plate). Alternatively, the anti-reflection layer RPL may include color filters that selectively transmit light of a specific wavelength.

The passivation layer WDL may be disposed on one surface of the anti-reflection layer RPL. The passivation layer WDL may be a cover window formed of a polymer resin or glass. The passivation layer WDL may be attached onto one surface of the anti-reflection layer RPL by a transparent adhesive film or a transparent adhesive.

Figure 4:
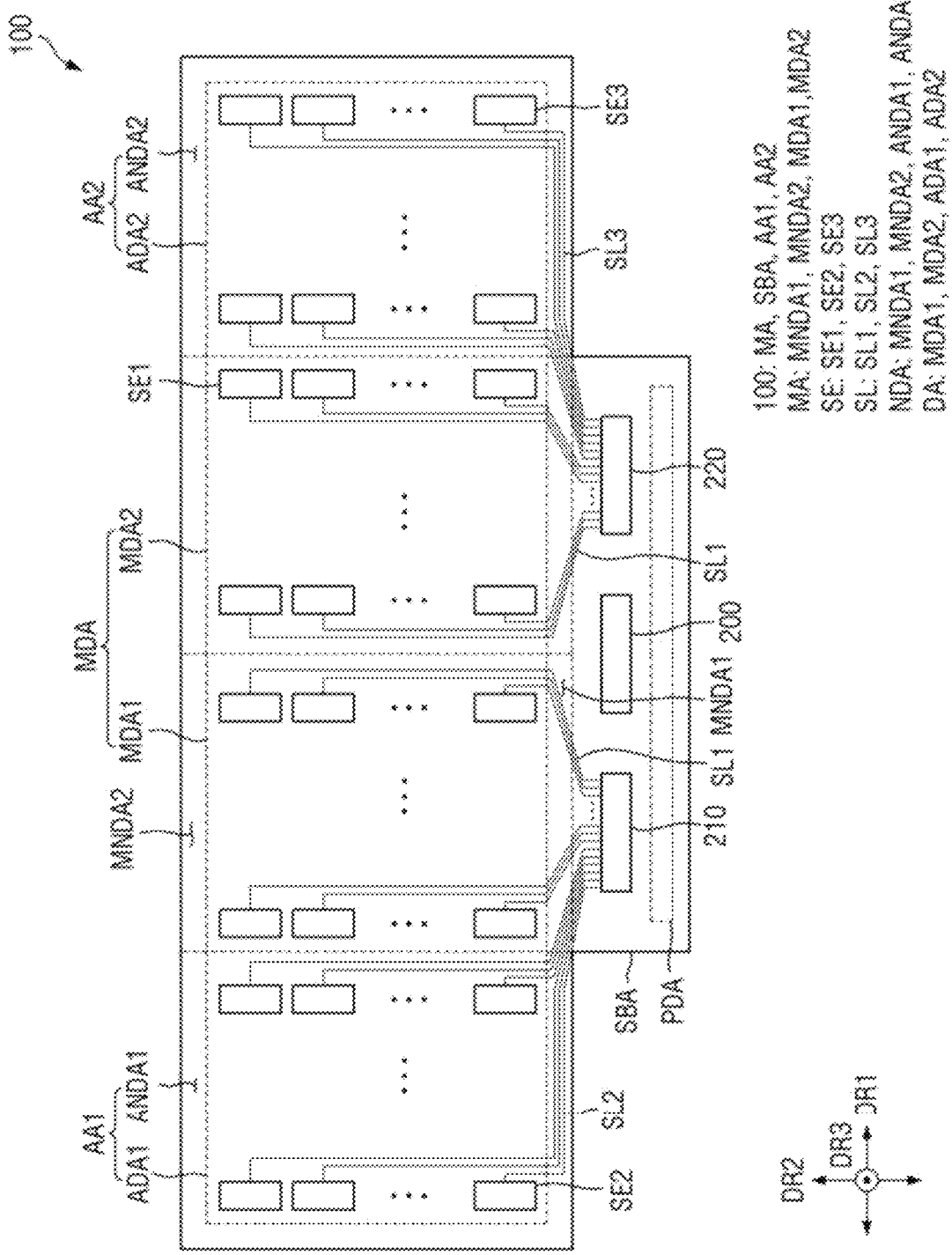
FIG. 4 is a layout diagram illustrating sensor electrodes and sensor lines of a touch sensing unit of a display panel according to an embodiment.

FIG. 4 is a layout diagram illustrating sensor electrodes and sensor lines of a touch sensing unit of a display panel according to an embodiment.

Referring to FIG. 4, the display panel 100 may include a display area DA and a non-display area NDA. The display area DA may be an area that displays an image, and the non-display area NDA may be an area that does not display an image. The non-display area NDA may be disposed around the display area DA. The non-display area NDA may be disposed to surround the display area DA.

The display area DA and the non-display area NDA may be disposed in the main area MA, the first auxiliary area AA1, and the second auxiliary area AA2.

The non-display area NDA may include a first main non-display area MNDA1 disposed at a lower edge of the main area MA and a second main non-display area MNDA2 disposed at an upper edge of the main area MA. The first main non-display area MNDA1 may be disposed between a main display area MDA and the sub-area SBA.

In addition, the non-display area NDA may further include a first auxiliary non-display area ANDA1 disposed at an upper edge, a lower edge, and a left edge of the first auxiliary area AA1 and a second auxiliary non-display area ANDA2 disposed on an upper edge, a lower edge, and a right edge in the second auxiliary area AA2. The first main non-display area MNDA1 may be adjacent to the sub-area SBA.

The display area DA may include a first main display area MDA1 and a second main display area MDA2 disposed in the main area MA, a first auxiliary display area ADA1 disposed in the first auxiliary area AA1, and a second auxiliary display area ADA2 disposed in the second auxiliary area AA2.

The first main display area MDA1 may be disposed adjacent to the first auxiliary display area ADA1, and the second main display area MDA2 may be disposed adjacent to the second auxiliary display area ADA2. The first main display area MDA1 is disposed between the first auxiliary display area ADA1 and the second main display area MDA2, and the second main display area MDA2 may be disposed between the second auxiliary display area ADA2 and the first main display area MDA1.

Meanwhile, for convenience of explanation, the first main display area MDA1 and the second main display area MDA2 may be referred to as a first area, and the first auxiliary display area ADA1 and the second auxiliary display area ADA2 may be referred to as a second area.

Pixels may be disposed in each of the first main display area MDA1, the second main display area MDA2, the first auxiliary display area ADA1, and the second auxiliary display area ADA2. Each of the pixels may include a plurality of emission areas to display an image.

The display panel 100 includes sensor electrodes SE and sensor lines SL. The display panel 100 may sense a touch in a self-capacitance manner of applying a driving signal to each of the sensor electrodes SE and then sensing a voltage charged in a self-capacitance of each of the sensor electrodes SE.

The sensor electrodes SE include first sensor electrodes SE1 disposed in the first main display area MDA1 and the second main display area MDA2, second sensor electrodes SE2 disposed in the first auxiliary display area ADA1, and third sensor electrodes SE3 disposed in the second auxiliary display area ADA2. The sensor lines SL may include first sensor lines SL1 connected to the first sensor electrodes SE1, second sensor lines SL2 connected to the second sensor electrodes SE2, and third sensor lines SL3 connected to the third sensor electrodes SE3.

The first sensor electrodes SE1 may be arranged in a matrix shape along the first direction DR1 and the second direction DR2 in the first main display area MDA1 and the second main display area MDA2. The first sensor electrodes SE2 may be arranged in a matrix shape along the first direction DR1 and the second direction DR2 in the first auxiliary display area ADA1. The third sensor electrodes SE3 may be arranged in a matrix shape along the first direction DR1 and the second direction DR2 in the second auxiliary display area ADA2. Each of the first sensor electrodes SE1, the second sensor electrodes SE2, and the third sensor electrodes SE3 may overlap a plurality of pixels.

The first sensor electrodes SE1 may be connected to the first sensor lines SL1 in a one-to-one manner. That is, each of the first sensor electrodes SE1 may be connected to one first sensor line SL1, and each of the first sensor lines SL1 may be connected to one first sensor electrode SE1. Therefore, the number of first sensor electrodes SE1 may be the same as the number of first sensor lines SL1.

The second sensor electrodes SE2 may be connected to the second sensor lines SL2 in a one-to-one manner. That is, each of the second sensor electrodes SE2 may be connected to one second sensor line SL2, and each of the second sensor lines SL2 may be connected to one second sensor electrode SE2. Therefore, the number of second sensor electrodes SE2 may be the same as the number of second sensor lines SL2.

The third sensor electrodes SE3 may be connected to the third sensor lines SL3 in a one-to-one manner. That is, each of the third sensor electrodes SE3 may be connected to one third sensor line SL3, and each of the third sensor lines SL3 may be connected to one third sensor electrode SE3. Therefore, the number of third sensor electrodes SE3 may be the same as the number of third sensor lines SL3.

The first sensor lines SL1 may be connected to the first multiplexer 210 of the sub-area SBA through the first main non-display area MNDA1. In addition, the second sensor lines SL2 may be connected to the first multiplexer 210 of the sub-area SBA through the first auxiliary non-display area ANDA1 and the first main non-display area MNDA1. In addition, the third sensor lines SL3 may be connected to the second multiplexer 220 of the sub-area SBA through the second auxiliary non-display area ANDA2 and the first main non-display area MNDA1.

Since all of the second sensor lines SL2 are disposed in the first auxiliary non-display area ANDA1, a width of the first auxiliary non-display area ANDA1 may become great due to the second sensor lines SL2. In addition, since all of the third sensor lines SL3 are disposed in the second auxiliary non-display area ANDA2, a width of the second auxiliary non-display area ANDA2 may become great due to the third sensor lines SL3. As the width of the first auxiliary non-display area ANDA1 increases, a ratio of the first auxiliary display area ADA1 to the first auxiliary area AA1 decreases, and as the width of the second auxiliary non-display area ANDA2 increases, a ratio of the second auxiliary display area ADA2 to the second auxiliary area AA2 decreases. Thus, it is difficult to apply a structure in which the width of the first auxiliary non-display area ANDA1 and the width of the second auxiliary non-display area ANDA2 are great to a concept in which an area of the display area DA is as great as possible. Therefore, the width of the first auxiliary non-display area ANDA1 and the width of the second auxiliary non-display area ANDA2 need to be decreased.

Figure 5:
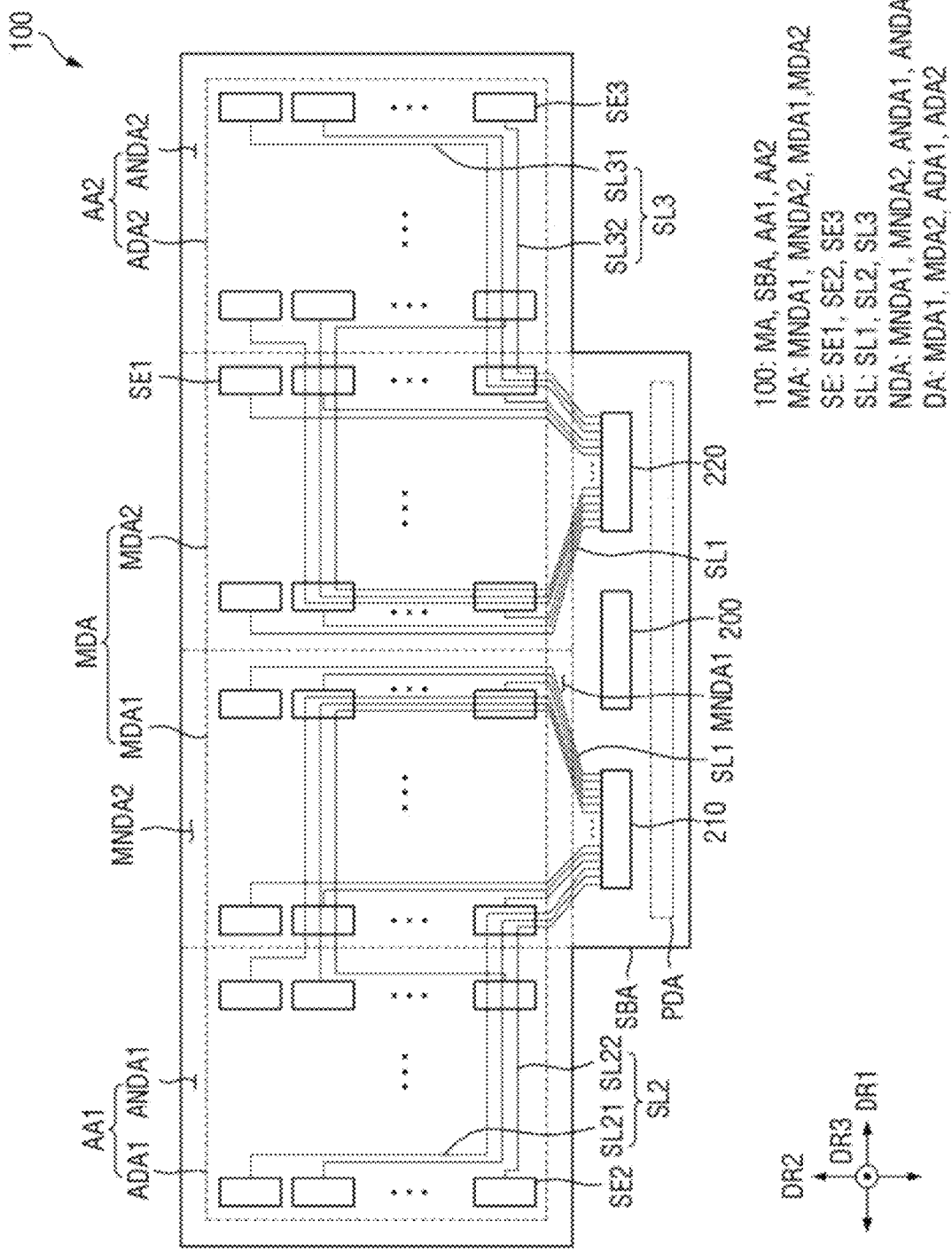
FIG. 5 is a layout diagram illustrating sensor electrodes and sensor lines of a touch sensing unit of a display panel according to an embodiment.

FIG. 5 is a layout diagram illustrating sensor electrodes and sensor lines of a touch sensing unit of a display panel according to an embodiment. The embodiment of FIG. 5 is different from the embodiment of FIG. 4 in that the sensor lines SL2 are not disposed in the first auxiliary non-display area ANDA1 and the third sensor lines SL3 are not disposed in the second auxiliary non-display area ANDA2. In FIG. 5, a description overlapping an embodiment of FIG. 4 will be omitted.

Referring to FIG. 5, each of the second sensor lines SL2 may include first sub-sensor lines SL21 and second sub-sensor lines SL22.

The first sub-sensor lines SL21 may be connected to the second sensor electrodes SE2 in a one-to-one manner. That is, each of the first sub-sensor lines SL21 may be connected to one second sensor electrode SE2, and each of the second sensor electrodes SE2 may be connected to one first sub-sensor line SL21. The first sub-sensor lines SL21 may be disposed in the first auxiliary display area ADA1. The first sub-sensor lines SL21 may extend in the second direction DR2 in the first auxiliary display area ADA1.

The second sub-sensor lines SL22 may be connected to the first sub-sensor lines SL21 in a one-to-one manner. That is, each of the second sub-sensor lines SL22 may be connected to one first sub-sensor line SL21, and each of the first sub-sensor lines SL21 may be connected to one second sub-sensor line SL22. The first sub-sensor line SL21 and the second sub-sensor line SL22 may be connected to each other through a first sensor connection hole SH1.

The second sub-sensor lines SL22 may be disposed in the first auxiliary display area ADA1, the first main display area MDA1, and the first main non-display area MNDA1. The second sub-sensor lines SL22 may extend in the first direction DR1 in the first auxiliary display area ADA1 and may extend in the second direction DR2 in the first main display area MDA1. Each of the second sub-sensor lines SL22 may include a curved portion curved from the first direction DR1 to the second direction DR2 in the first main display area MDA1.

Each of the third sensor lines SL3 may include third sub-sensor lines SL31 and fourth sub-sensor lines SL32.

The third sub-sensor lines SL31 may be connected to the third sensor electrodes SE3 in a one-to-one manner. That is, each of the third sub-sensor lines SL31 may be connected to one third sensor electrode SE3, and each of the third sensor electrodes SE3 may be connected to one third sub-sensor line SL31. The third sub-sensor lines SL31 may be disposed in the second auxiliary display area ADA2. The third sub-sensor lines SL31 may extend in the second direction DR2 in the second auxiliary display area ADA2.

The fourth sub-sensor lines SL32 may be connected to the third sub-sensor lines SL31 in a one-to-one manner. That is, each of the fourth sub-sensor lines SL32 may be connected to one third sub-sensor line SL31, and each of the third sub-sensor lines SL31 may be connected to one fourth sub-sensor line SL32. The third sub-sensor line SL31 and the fourth sub-sensor line SL32 may be connected to each other through a second sensor connection hole SH2.

The fourth sub-sensor lines SL32 may be disposed in the second auxiliary display area ADA2, the second main display area MDA2, and the first main non-display area MNDA1. The fourth sub-sensor lines SL32 may extend in the first direction DR1 in the second auxiliary display area ADA2 and may extend in the second direction DR2 in the second main display area MDA2. Each of the fourth sub-sensor lines SL32 may include a curved portion curved from the first direction DR1 to the second direction DR2 in the second main display area MDA2.

As illustrated in FIG. 5, the second sensor lines SL2 are connected to the first multiplexer 210 of the sub-area SBA through the first auxiliary display area ADA1, the first main display area MDA1, and the first main non-display area MNDA1. Thus, the second sensor lines SL2 are not disposed in the first auxiliary non-display area ANDA1. As illustrated in FIG. 5, the third sensor lines SL3 are connected to the second multiplexer 220 of the sub-area SBA through the second auxiliary display area ADA2, the second main display area MDA2, and the first main non-display area MNDA1. Thus, the third sensor lines SL3 are not disposed in the second auxiliary non-display area ANDA2. Therefore, an increase in the width of the first auxiliary non-display area ANDA1 due to the second sensor lines SL2 may be prevented. In addition, an increase in the width of the second auxiliary non-display area ANDA2 due to the third sensor lines SL3 may be prevented. For example, since the second sensor lines SL2 do not pass through the first auxiliary non-display area ANDA1, the size of the first auxiliary non-display area ANDA1 can be reduced. For example, since the third sensor lines SL3 do not pass through the second auxiliary non-display area ANDA2, the size of the second auxiliary non-display area ANDA2 can be reduced.

Figure 6:
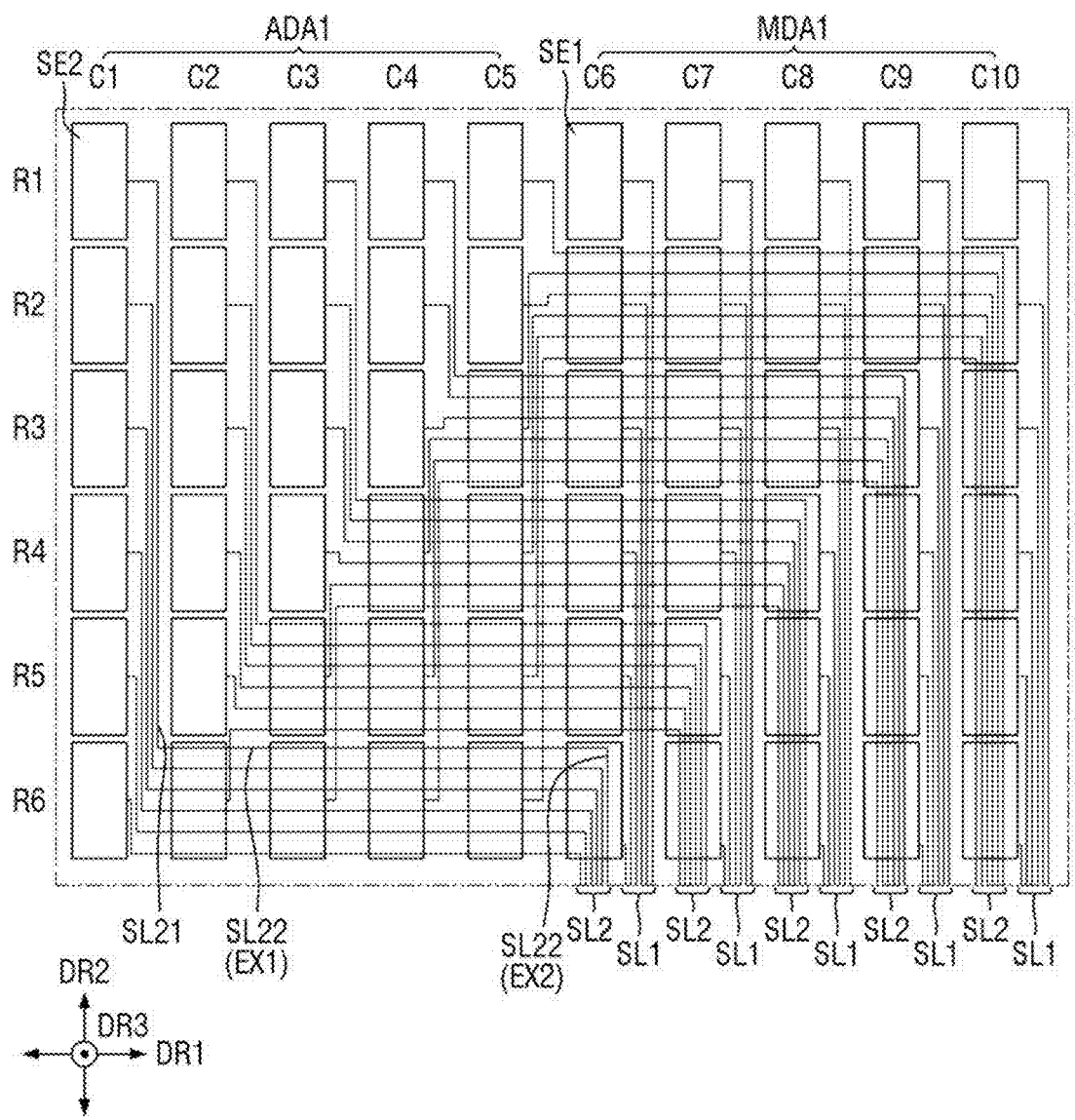
FIG. 6 is a layout diagram illustrating an example of first sensor electrodes, second sensor electrodes, first sensor lines, and second sensor lines in a first main display area and a first auxiliary display area of FIG. 5.
Figure 7:
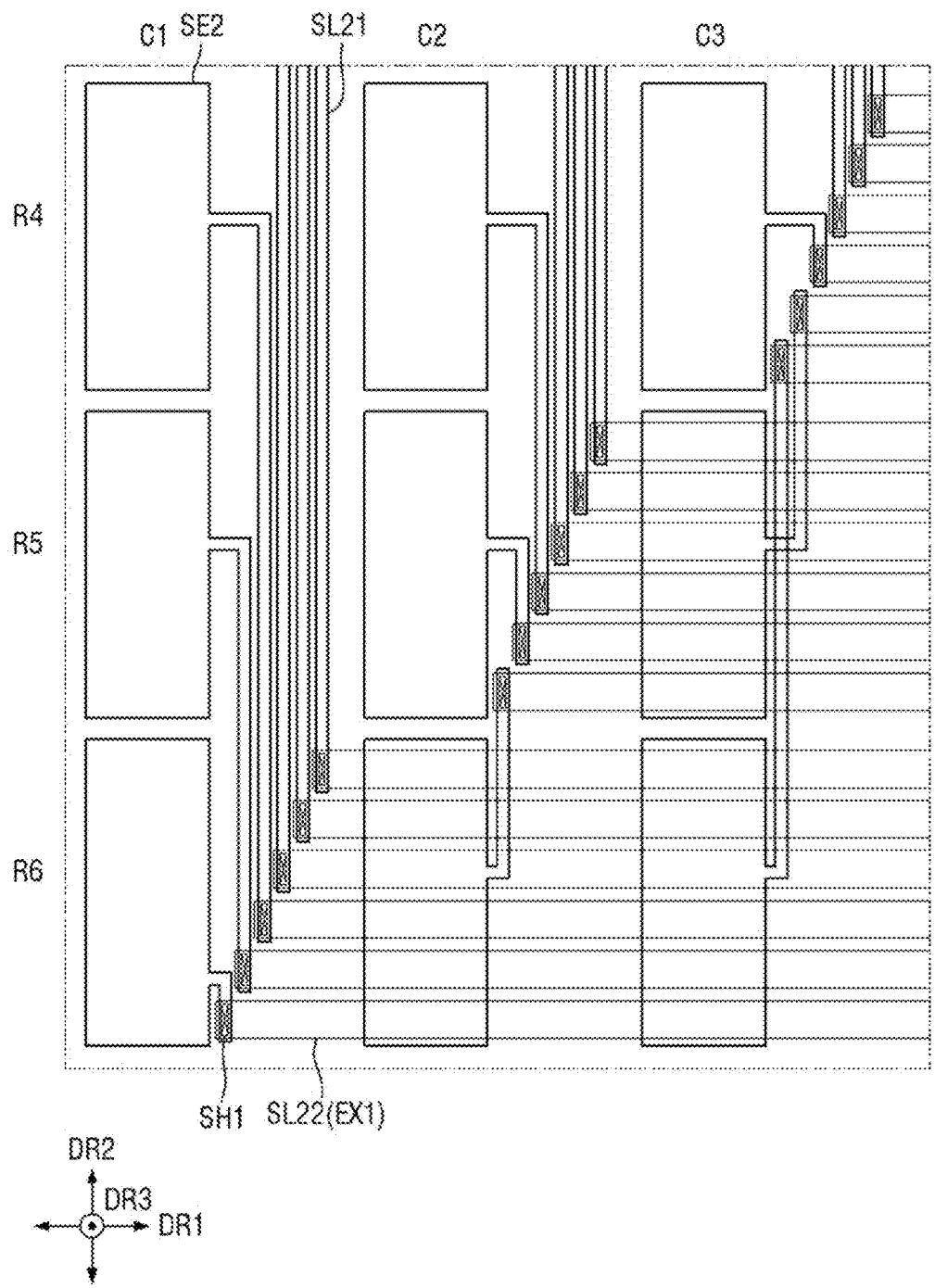
FIG. 7 is a layout diagram illustrating second sensor electrodes, first sub-sensor lines, and second sub-sensor lines disposed in fourth to sixth rows and first to third columns of FIG. 6 in detail.
Figure 8:
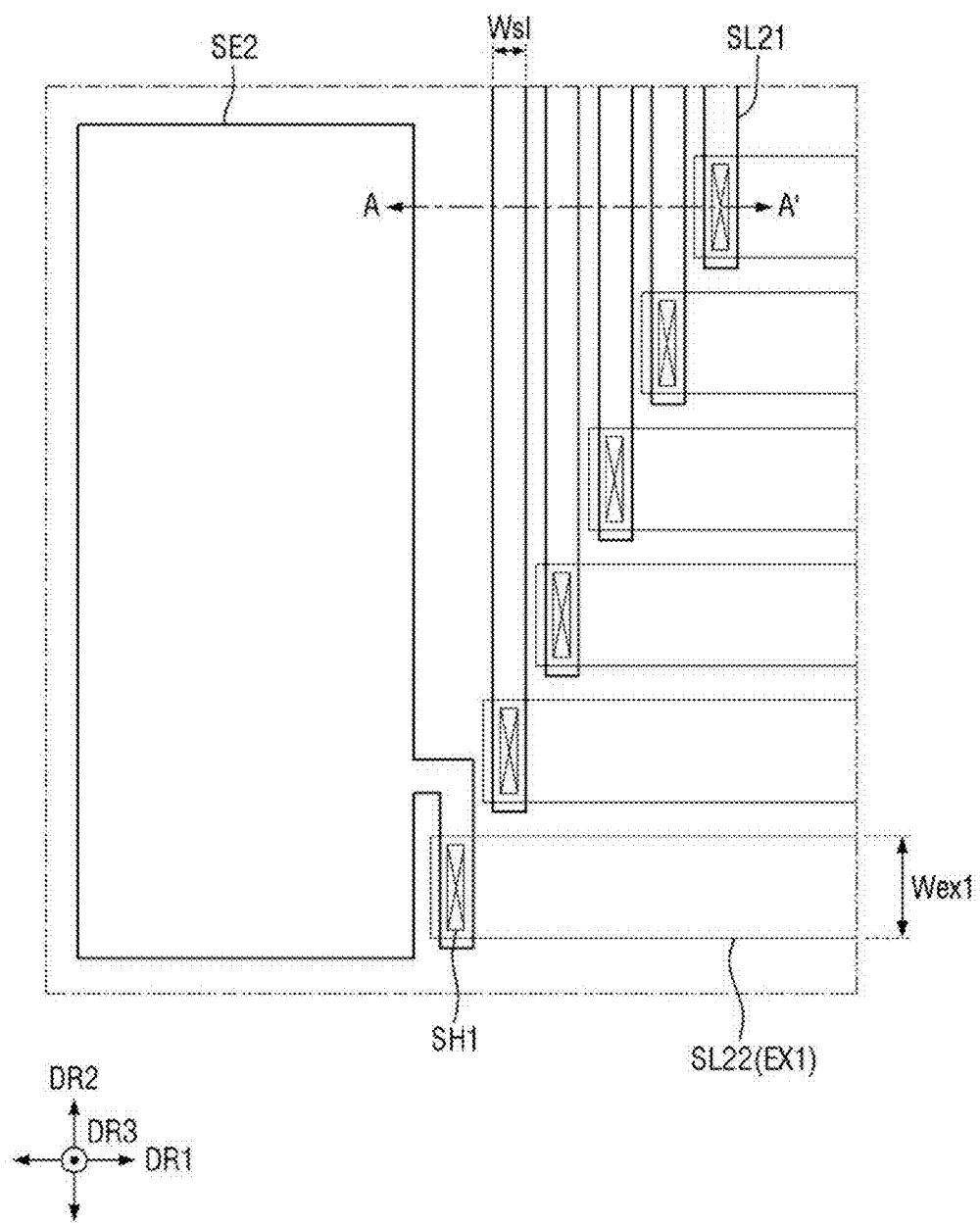
FIG. 8 is a layout diagram illustrating a second sensor electrode, first sub-sensor lines, and second sub-sensor lines disposed in the sixth row and the first column of FIG. 7 in detail.
Figure 9:
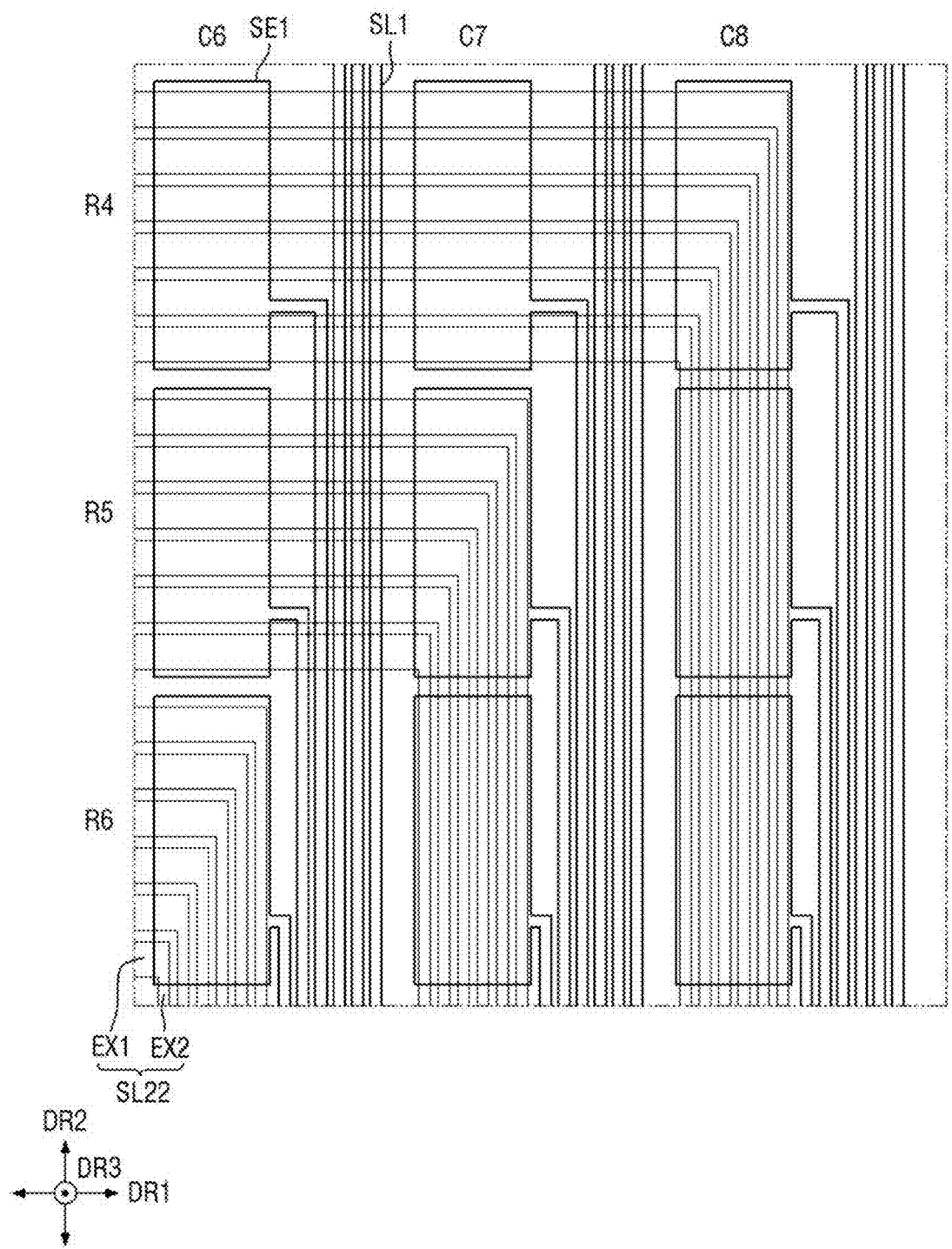
FIG. 9 is a layout diagram illustrating first sensor electrodes, first sensor lines, and second sub-sensor lines disposed in the fourth to sixth rows and sixth to eighth columns of FIG. 6 in detail.
Figure 10:
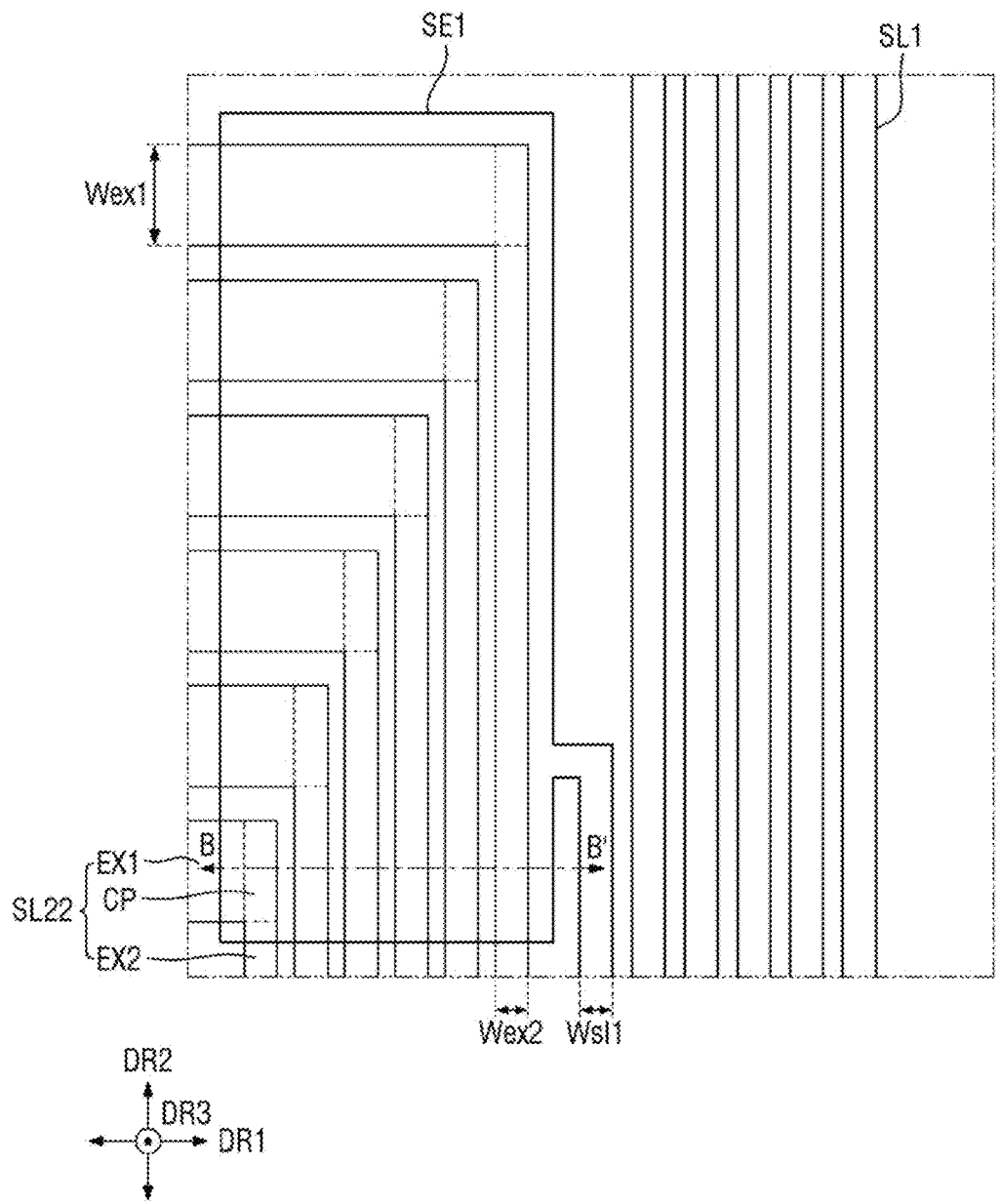
FIG. 10 is a layout diagram illustrating a first sensor electrode, first sensor lines, and second sub-sensor lines disposed in the sixth row and the sixth column of FIG. 9 in detail.

FIG. 6 is a layout diagram illustrating first sensor electrodes, second sensor electrodes, first sensor lines, and second sensor lines in a first main display area and a first auxiliary display area according to an embodiment. FIG. 7 is a layout diagram illustrating second sensor electrodes, first sub-sensor lines, and second sub-sensor lines disposed in fourth to sixth rows and first to third columns of FIG. 6 in detail. FIG. 8 is a layout diagram illustrating a second sensor electrode, first sub-sensor lines, and second sub-sensor lines disposed in the sixth row and the first column of FIG. 7 in detail. FIG. 9 is a layout diagram illustrating first sensor electrodes, first sensor lines, and second sub-sensor lines disposed in the fourth to sixth rows and sixth to eighth columns of FIG. 6 in detail. FIG. 10 is a layout diagram illustrating a first sensor electrode, first sensor lines, and second sub-sensor lines disposed in the sixth row and the sixth column of FIG. 9 in detail.

Referring to FIGS. 6 to 10, the first sensor electrodes SE1 may be disposed in six rows and five columns in the first main display area MDA1. For example, the first sensor electrodes SE1 may be disposed in first to sixth rows R1 to R6 and sixth to tenth columns C6 to C10 in the first main display area MDA1.

In an embodiment, a length of each of the first sensor electrodes SE1 in the first direction DR1 is smaller than a length of each of the first sensor electrodes SE1 in the second direction DR2. In an embodiment, a distance between the first sensor electrodes SE1 neighboring each other in the first direction DR1 is greater than a distance between the first sensor electrodes SE1 neighboring each other in the second direction DR2. The first sensor electrodes SE1 may be configured to sense a touch of a user.

The second sensor electrodes SE2 may be disposed in six rows and five columns in the first auxiliary display area ADA1 For example, the second sensor electrodes SE2 may be disposed in the first to sixth rows R1 to R6 and first to fifth columns C to C5 in the first auxiliary display area ADA1. The second sensor electrodes SE2 may be configured to sense a touch of a user In an embodiment, a length of each of the second sensor electrodes SE2 in the first direction DR1 is smaller than a length of each of the second sensor electrodes SE2 in the second direction DR2. In an embodiment, a distance between the second sensor electrodes SE2 neighboring each other in the first direction DR1 is greater than a distance between the second sensor electrodes SE2 neighboring each other in the second direction DR2.

An area of the first sensor electrode SE1 and an area of the second sensor electrode SE2 may be substantially the same as each other. In addition, a shape of the first sensor electrode SE1 in a plan view and a shape of the second sensor electrode SE2 in a plan view may be substantially the same as each other.

The first sensor lines SL1 may extend in the second direction DR2. The first sensor lines SL1 may be connected to the first sensor electrodes SE1 in a one-to-one manner. In an embodiment, each of the first sensor lines SL1 do not overlap the first sensor electrodes SE1 in the third direction DR3.

The first sensor lines SL1 connected to the first sensor electrodes SE1 in the sixth column C6 may be disposed between the first sensor electrodes SE1 in the sixth column C6 and the first sensor electrodes SE1 in the seventh column C7. That is, the first sensor lines SL1 connected to the first sensor electrodes SE1 in the sixth column C6 may be disposed on the right side of the first sensor electrodes SE1 in the sixth column C6.

In addition, the first sensor lines SL1 connected to the first sensor electrodes SE1 in the seventh column C7 may be disposed between the first sensor electrodes SE1 in the seventh column C7 and the first sensor electrodes SE1 in the eighth column C8. The first sensor lines SL1 connected to the first sensor electrodes SE1 in the eighth column C8 may be disposed between the first sensor electrodes SE1 in the eighth column C8 and the first sensor electrodes SE1 in the ninth column C9. The first sensor lines SL1 connected to the first sensor electrodes SE1 in the ninth column C9 may be disposed between the first sensor electrodes SE1 in the ninth column C9 and the first sensor electrodes SE1 in the tenth column C10. The first sensor lines SL1 connected to the first sensor electrodes SE1 in the tenth column C10 may be disposed on the right side of the first sensor electrodes SE1 in the tenth column C10.

The second sensor lines SL2 may include first sub-sensor lines SL21 extending in the second direction DR2 and second sub-sensor lines SL22 extending in the first direction DR1.

The first sub-sensor lines SL21 may extend in the second direction DR2. The first sub-sensor lines SL21 may be connected to the second sensor electrodes SE2 in a one-to-one manner. In an embodiment, each of the first sub-sensor lines SL21 do not overlap the second sensor electrodes SE2 in the third direction DR3.

The first sub-sensor lines SL21 connected to the second sensor electrodes SE2 in the first column C1 may be disposed between the second sensor electrodes SE2 in the first column C1 and the second sensor electrodes SE2 in the second column C2. That is, the first sub-sensor lines SL21 connected to the second sensor electrodes SE2 in the first column C1 may be disposed on the right side of the second sensor electrodes SE2 in the first column C1.

In addition, the first sub-sensor lines SL21 connected to the second sensor electrodes SE2 in the second column C2 may be disposed between the second sensor electrodes SE2 in the second column C2 and the second sensor electrodes SE2 in the third column C3. The first sub-sensor lines SL21 connected to the second sensor electrodes SE2 in the third column C3 may be disposed between the second sensor electrodes SE2 in the third column C3 and the second sensor electrodes SE2 in the fourth column C4. The first sub-sensor lines SL21 connected to the second sensor electrodes SE2 in the fourth column C4 may be disposed between the second sensor electrodes SE2 in the fourth column C4 and the second sensor electrodes SE2 in the fifth column C5. The first sub-sensor lines SL21 connected to the second sensor electrodes SE2 in the fifth column C5 may be disposed between the second sensor electrodes SE2 in the fifth column C5 and the first sensor electrodes SE1 in the sixth column C6.

Each of the second sub-sensor lines SL22 may include a first extending portion EX1 extending in the first direction DR1 in the first auxiliary display area ADA1, a second extending portion EX2 extending in the second direction DR2 in the first main display area MDA1, and a curved portion CP curved from the first direction DR1 to the second direction DR2 in the first main display area MDA1.

The first extending portion EX1 may be disposed in the first main display area MDA1 and the first auxiliary display area ADA1. The second extending portion EX2 may be disposed in the first main display area MDA1. As illustrated in FIG. 8, a width Wex1 of the first extending portion EX1 may be greater than a width Ws1 of the first sub-sensor line SL21. As illustrated in FIG. 10, the width Wex1 of the first extending portion EX1 may be greater than a width Wex2 of the second extending portion EX2. In addition, as illustrated in FIG. 10, the width Wex1 of the first extending portion EX1 may be greater than a width Ws1 of the first sensor line SL1.

The curved portion CP may be disposed between the first extending portion EX1 and the second extending portion EX2. The curved portion CP may overlap the first sensor electrode SE1.

The second sub-sensor lines SL22 may be connected to the first sub-sensor lines SL21 in a one-to-one manner. The second sub-sensor lines SL22 may be disposed in the second to sixth rows R2 to R6 in the first auxiliary display area ADA1. For example, the second sub-sensor lines SL22 disposed in the sixth row R6 may be connected to the first sub-sensor lines SL21 disposed in the first column C1, in a one-to-one manner. The first extending portion EX1 of each of the second sub-sensor lines SL22 disposed in the sixth row R6 may be connected to the first sub-sensor line SL21 through the first sensor connection hole SH1.

In addition, the second sub-sensor lines SL22 disposed in the fifth row R5 may be connected to the first sub-sensor lines SL21 disposed in the second column C2, in a one-to-one manner. The second sub-sensor lines SL22 disposed in the fourth row R4 may be connected to the first sub-sensor lines SL21 disposed in the third column C3, in a one-to-one manner. The second sub-sensor lines SL22 disposed in the third row R3 may be connected to the first sub-sensor lines SL21 disposed in the fourth column C4, in a one-to-one manner. The second sub-sensor lines SL22 disposed in the second row R2 may be connected to the first sub-sensor lines SL21 disposed in the fifth column C5, in a one-to-one manner.

It has been illustrated in FIGS. 6 to 10 that the second sub-sensor lines SL22 are disposed in the second to sixth rows R2 to R6 in the first auxiliary display area ADA1, but embodiments of the present disclosure are not limited thereto. The second sub-sensor lines SL22 may also be disposed in the first to fifth rows R1 to R5 in the first auxiliary display area ADA1.

In addition, the second sub-sensor lines SL22 disposed in the third to sixth rows R3 to R6 may overlap the second sensor electrodes SE2 in the third direction DR3. For example, the first extending portion EX1 of each of the second sub-sensor lines SL22 disposed in the sixth row R6 may overlap the second sensor electrodes SE2 disposed in the sixth row R6 in the second to fifth columns C2 to C5, in the third direction DR3. The first extending portion EX1 of each of the second sub-sensor lines SL22 disposed in the fifth row R5 may overlap the second sensor electrodes SE2 disposed in the fifth row R5 in the third to fifth columns C3 to C5, in the third direction DR3. The first extending portion EX1 of each of the second sub-sensor lines SL22 disposed in the fourth row R4 may overlap the second sensor electrodes SE2 disposed in the fourth row R4 in the fourth and fifth columns C4 and C5, in the third direction DR3. The first extending portion EX1 of each of the second sub-sensor lines SL22 disposed in the third row R3 may overlap the second sensor electrodes SE2 disposed in the third row R3 in the fifth columns C5, in the third direction DR3. In this embodiment, the number of second sensor electrodes SE2 that the second sub-sensor lines SL22 overlap in the third direction DR3 may increase from the third row R3 toward the sixth row R6.

In addition, the second sub-sensor lines SL22 may intersect the first sub-sensor lines SL21 connected to the second sensor electrodes SE2 disposed in the second to fifth columns C2 to C5. For example, the first extending portion EX1 of each of the second sub-sensor lines SL22 disposed in the sixth row R6 may intersect the first sub-sensor lines SL21 connected to the second sensor electrodes SE2 disposed in the second to fifth columns C2 to C5. The first extending portion EX1 of each of the second sub-sensor lines SL22 disposed in the fifth row R5 may intersect the first sub-sensor lines SL21 connected to the second sensor electrodes SE2 disposed in the third to fifth columns C3 to C5. The first extending portion EX1 of each of the second sub-sensor lines SL22 disposed in the fourth row R4 may intersect the first sub-sensor lines SL21 connected to the second sensor electrodes SE2 disposed in the fourth and fifth columns C4 and C5. The first extending portion EX1 of each of the second sub-sensor lines SL22 disposed in the third row R3 may intersect the first sub-sensor lines SL21 connected to the second sensor electrodes SE2 disposed in the fifth column C5. In this embodiment, the number of first sub-sensor lines SL21 that the second sub-sensor lines SL22 intersect may increase from the third row R3 toward the sixth row R6.

In addition, the second sub-sensor lines SL22 may overlap the first sensor electrodes SE1 disposed in the sixth to tenth columns C6 to C10, in the third direction DR3. For example, the second extending portion EX2 of each of the second sub-sensor lines SL22 disposed in the sixth column C6 may overlap the first sensor electrode SE1 in the third direction DR3. The second extending portion EX2 of each of the second sub-sensor lines SL22 disposed in the seventh column C7 may overlap the first sensor electrodes SE1 in the third direction DR3. The second extending portion EX2 of each of the second sub-sensor lines SL22 disposed in the eighth column C8 may overlap the first sensor electrodes SE1 in the third direction DR3. The second extending portion EX2 of each of the second sub-sensor lines SL22 disposed in the ninth column C9 may overlap the first sensor electrodes SE1 in the third direction DR3. The second extending portion EX2 of each of the second sub-sensor lines SL22 disposed in the tenth column C10 may overlap the first sensor electrodes SE1 in the third direction DR3. In this embodiment, the number of first sensor electrodes SE1 that the second extending portions EX2 of the second sub-sensor lines SL22 overlap in the third direction DR3 may increase from the sixth column C6 toward the tenth column C10.

In addition, the second sub-sensor lines SL22 may intersect the first sensor lines SL1 connected to the first sensor electrodes SE1 disposed in the sixth to ninth columns C6 to C9. For example, the first extending portion EX1 of each of the second sub-sensor lines SL22 disposed in the fifth row R5 may intersect the first sensor lines SL1 connected to the first sensor electrode SE1 disposed in the sixth column C6. The first extending portion EX1 of each of the second sub-sensor lines SL22 disposed in the fourth row R4 may intersect the first sensor lines SL1 connected to the first sensor electrode SE1 disposed in sixth and the seventh column C6 and C7. The first extending portion EX1 of each of the second sub-sensor lines SL22 disposed in the third row R3 may intersect the first sensor lines SL1 connected to the first sensor electrode SE1 disposed in the sixth to eighth column C6 to C8. The first extending portion EX1 of each of the second sub-sensor lines SL22 disposed in the second row R2 may intersect the first sensor lines SL1 connected to the first sensor electrode SE1 disposed in the sixth to ninth column C6 to C9. In this embodiment, the number of first sensor lines SL1 that the second sub-sensor lines SL22 intersect may decrease from the second row R2 toward the fifth row R5.

Meanwhile, the first sensor electrodes SE1, the third sensor electrodes SE3, the first sensor lines SL1, and the third sensor lines SL3 in the second main display area MDA2 and the second auxiliary display area ADA2 are substantially the same as the first sensor electrodes SE1, the second sensor electrodes SE2, the first sensor lines SL1, and the second sensor lines SL2 in the first main display area MDA1 and the first auxiliary display area ADA1 described with reference to FIGS. 6 to 10, and a description therefor will thus be omitted.

Figure 11:
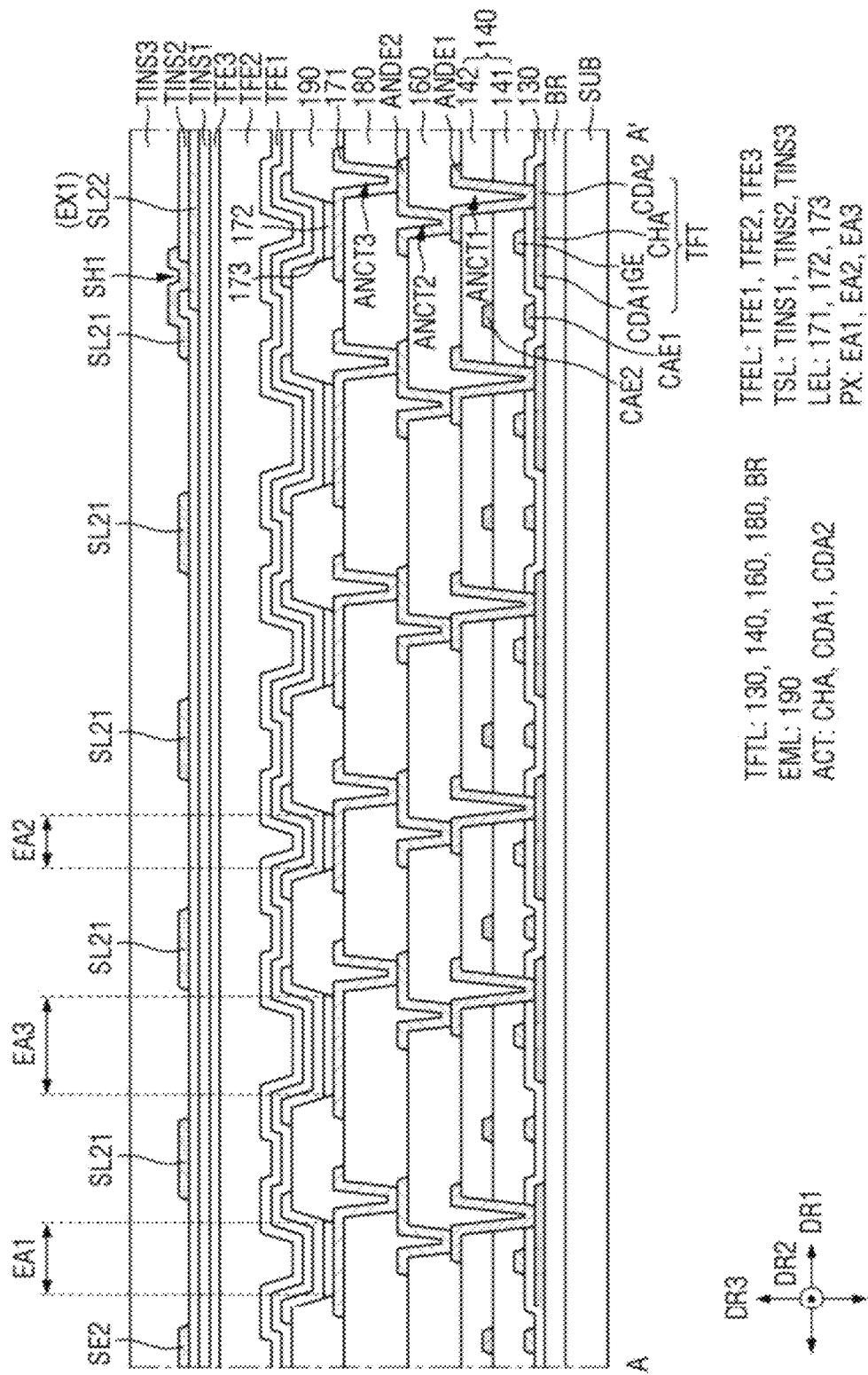
FIG. 11 is a cross-sectional view illustrating an example of the touch sensing unit taken along line A-A' of FIG. 8.

FIG. 11 is a cross-sectional view illustrating an example of the touch sensing unit taken along line A-A' of FIG. 8.

Figure 12:
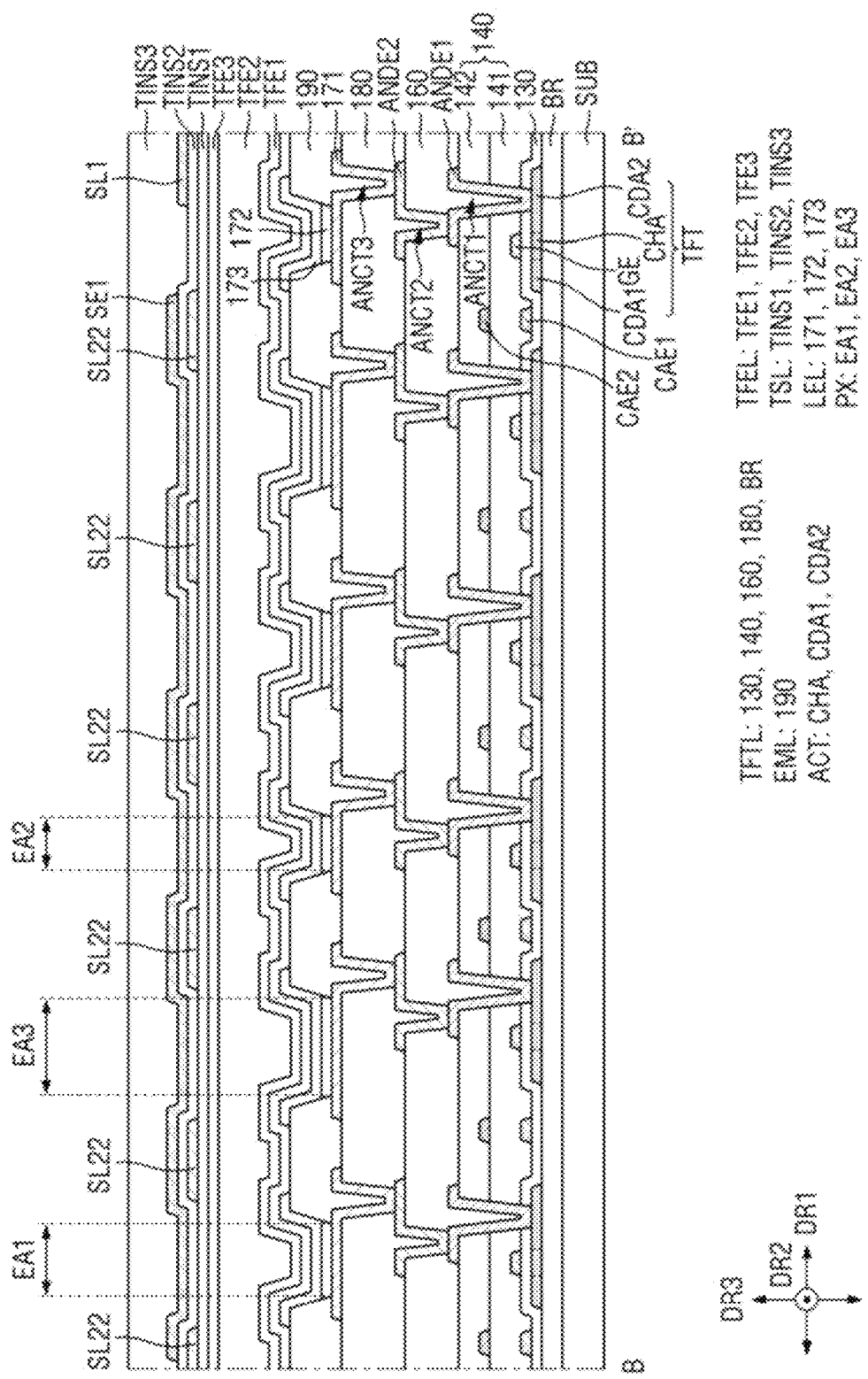
FIG. 12 is a cross-sectional view illustrating an example of the touch sensing unit taken along line B-B' of FIG. 10.

FIG. 12 is a cross-sectional view illustrating an example of the touch sensing unit taken along line B-B' of FIG. 10.

Referring to FIGS. 11 and 12, a substrate SUB may be made of an insulating material such as a polymer resin. For example, the substrate SUB may include polyimide. The substrate SUB may be a flexible substrate that may be bent, folded, and rolled.

A barrier film BR may be disposed on the substrate SUB. The barrier film BR is a film for protecting thin film transistors of a thin film transistor layer TFTL and light emitting layers 172 of a light emitting element layer EML from moisture permeating through the substrate SUB vulnerable to moisture permeation. The barrier film BR may include a plurality of inorganic films that are alternately stacked. For example, the barrier film BR may be formed as multiple films in which one or more inorganic films of a silicon nitride layer, a silicon oxynitride layer, a silicon oxide layer, a titanium oxide layer, and an aluminum oxide layer are alternately stacked.

The thin film transistor layer TFTL including the thin film transistors TFT may be disposed on the barrier film BR. Each of the thin film transistors TFT may include an active layer ACT and a gate electrode GE.

The active layer ACT of the thin film transistor TFT may be disposed on the buffer film BF. The active layer ACT may include a silicon semiconductor such as polycrystalline silicon, single crystal silicon, low-temperature polycrystalline silicon, or amorphous silicon. Alternatively, the active layer ACT may include an oxide semiconductor. In this embodiment, the active layer ACT may include IGZO (indium (In), gallium (Ga), zinc (Zn), and oxygen (O)), IGZTO (indium (In), gallium (Ga), zinc (Zn), tin (Sn), and oxygen (O)), or IGTO (indium (In), gallium (Ga), tin (Sn), and oxygen (O)).

The active layer ACT may include a channel region CHA, a first conductive region CDA1, and a second conductive region CDA2. The first conductive region CDA1 and the second conductive region CDA2 may be regions having conductivity by doping a silicon semiconductor or an oxide semiconductor with ions or impurities. The first conductive region CDA1 may serve as a source electrode, and the second conductive region CDA2 may serve as a drain electrode.

A gate insulating film 130 may be disposed on the active layer ACT of the thin film transistor TFT. The gate insulating film 130 may be formed as an inorganic film, for example, a silicon nitride layer, a silicon oxynitride layer, a silicon oxide layer, a titanium oxide layer, or an aluminum oxide layer.

The gate electrode GE of the thin film transistor TFT and a first capacitor electrode CAE1 may be disposed on the gate insulating film 130. The gate electrode GE may overlap the channel region CHA of the active layer ACT in the third direction DR3. Each of the gate electrode GE and the first capacitor electrode CAE1 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A first interlayer insulating film 141 may be disposed on the gate electrode GE and the first capacitor electrode CAE1. The first interlayer insulating film 141 may be formed as an inorganic film, for example, a silicon nitride layer, a silicon oxynitride layer, a silicon oxide layer, a titanium oxide layer, or an aluminum oxide layer.

A second capacitor electrode CAE2 may be disposed on the first interlayer insulating film 141. The second capacitor electrode CAE2 may overlap the first capacitor electrode CAE1 in the third direction DR3. Since the first interlayer insulating film 141 has a predetermined dielectric constant, a capacitor may be formed by the first capacitor electrode CAE1, the second capacitor electrode CAE2, and the first interlayer insulating film 141 disposed between the first capacitor electrode CAE1 and the second capacitor electrode CAE2. The second capacitor electrode CAE2 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A second interlayer insulating film 142 may be disposed on the second capacitor electrode CAE2. The second interlayer insulating film 142 may be formed as an inorganic film, for example, a silicon nitride layer, a silicon oxynitride layer, a silicon oxide layer, a titanium oxide layer, or an aluminum oxide layer. The second interlayer insulating film 142 may include a plurality of inorganic films.

A first anode connection electrode ANDE1 may be disposed on the second interlayer insulating film 142. The first anode connection electrode ANDE1 may be connected to the second conductive region CDA2 through a first anode contact hole ANCT1 penetrating through the gate insulating film 130 and an interlayer insulating film 140 to expose the second conductive region CDA2 of the thin film transistor TFT. The first anode connection electrode ANDE1 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A first organic film 160 for planarization may be disposed on the first anode connection electrode ANDE1. The first organic film 160 may be formed as an organic film made of an acryl resin, an epoxy resin, a phenolic resin, a polyamide resin, a polyimide resin, or the like.

A second anode connection electrode ANDE2 may be disposed on the first organic film 160. The second anode connection electrode ANDE2 may be connected to the first anode connection electrode ANDE1 through a second anode contact hole ANCT2 penetrating through the first organic film 160 to expose the first anode connection electrode ANDE1. The second anode connection electrode ANDE2 may be formed as a single layer or multiple layers made of any one of molybdenum (Mo), aluminum (Al), chromium (Cr), gold (Au), titanium (Ti), nickel (Ni), neodymium (Nd), and copper (Cu), or alloys thereof.

A second organic film 180 may be disposed on the second anode connection electrode ANDE2. The second organic film 180 may be formed as an organic film made of an acryl resin, an epoxy resin, a phenolic resin, a polyamide resin, a polyimide resin, or the like.

It has been illustrated in FIGS. 11 and 12 that each of the thin film transistors TFT is formed as a top gate type in which the gate electrode GE is positioned above the active layer ACT, but embodiments of the present disclosure are not limited thereto. That is, each of the thin film transistors TFT may be formed as a bottom gate type in which the gate electrode GE is positioned under the active layer ACT or a double gate type in which the gate electrodes GE are positioned both above and under the active layer ACT.

The light emitting element layer EML including light emitting elements LEL and a bank 190 may be disposed on the second organic film 180. Each of the light emitting elements LEL includes a first light emitting electrode 171, the light emitting layer 172, and a second light emitting electrode 173. The first light emitting electrode 171 may be an anode electrode, and the second light emitting electrode 173 may be a cathode electrode.

The first light emitting electrode 171 may be formed on the second organic film 180. The first light emitting electrode 171 may be connected to the second anode connection electrode ANDE2 through a third anode contact hole ANCT3 penetrating through the second organic film 180 to expose the second anode connection electrode ANDE2.

In a top emission structure in which light is emitted toward the second light emitting electrode 173 based on the light emitting layer 172, the first light emitting electrode 171 may be formed of a metal material having high reflectivity, such as a stacked structure (Ti/Al/Ti) of aluminum and titanium, a stacked structure (ITO/Al/ITO) of aluminum and indium tin oxide (ITO), a stacked structure (ITO/Ag/ITO) of silver and ITO, an APC alloy, and a stacked structure (ITO/APC/ITO) of an APC alloy and ITO. The APC alloy is an alloy of silver (Ag), palladium (Pd), and copper (Cu).

The bank 190 may be disposed on the second organic film 180. The bank 190 may be formed to partition the first light emitting electrodes 171 to define light emitting units EA1, EA2, and EA3. That is, the bank 190 may be formed to cover edges of each of the first light emitting electrodes 171. The bank 190 may be formed to cover the third anode contact hole ANCT3. The bank 190 may be formed as an organic film made of an acryl resin, an epoxy resin, a phenolic resin, a polyamide resin, a polyimide resin, or the like.

Each of the pixels PX may include a plurality of light emitting units EA1, EA2, and EA3. It has been illustrated in FIGS. 11 and 12 that each of the pixels PX includes first to third light emitting units EA1, EA2, and EA3, but embodiments of the present disclosure are not limited thereto. The first light emitting unit EA1 may refer to an area emitting first light, the second light emitting unit EA2 may refer to an area emitting second light, and the third light emitting unit EA3 may refer to an area emitting third light. Each of the plurality of light emitting units EA1, EA2, and EA3 refers to an area in which the first light emitting electrode 171, the light emitting layer 172, and the second light emitting electrode 173 are sequentially stacked and holes from the first light emitting electrode 171 and electrons from the second light emitting electrode 173 are recombined with each other in the light emitting layer 172 to emit light.

The light emitting layer 172 is formed on the first light emitting electrode 171 and the bank 190. The light emitting layer 172 may include an organic material to emit light of a predetermined color. For example, the light emitting layer 172 includes a hole transporting layer, an organic material layer, and an electron transporting layer.

The second light emitting electrode 173 is formed on the light emitting layer 172. The second light emitting electrode 173 may be formed to cover the light emitting layer 172. The second light emitting electrode 173 may be a common layer commonly formed in the plurality of light emitting units EA1, EA2, and EA3. A capping layer may be formed on the second light emitting electrode 173.

In the top emission structure, the second light emitting electrode 173 may be formed of transparent conductive oxide (TCO) such as ITO or indium zinc oxide (IZO) capable of transmitting light therethrough or a semi-transmissive conductive material such as magnesium (Mg), silver (Ag), or an alloy of magnesium (Mg) and silver (Ag). When the second light emitting electrode 173 is formed of the semi-transmissive conductive material, emission efficiency may be increased by a micro cavity.

An encapsulation layer TFEL may be disposed on the second light emitting electrode 173. The encapsulation layer TFEL includes at least one inorganic film in order to prevent oxygen or moisture from permeating into the light emitting element layer EML. In addition, the encapsulation layer TFEL includes at least one organic film in order to protect the light emitting element layer EML from foreign materials such as dust. For example, the encapsulation layer TFEL includes a first encapsulation inorganic film TFE1, an encapsulation organic film TFE2, and a second encapsulation inorganic film TFE3.

The first encapsulation inorganic film TFE1 may be disposed on the second light emitting electrode 173, the encapsulation organic film TFE2 may be disposed on the first encapsulation inorganic film TFE1, and the second encapsulation inorganic film TFE3 may be disposed on the encapsulation organic film TFE2. The first encapsulation inorganic film TFEL and the second encapsulation inorganic film TFE3 may be formed as multiple films in which one or more inorganic films of a silicon nitride layer, a silicon oxynitride layer, a silicon oxide layer, a titanium oxide layer, and an aluminum oxide layer are alternately stacked. The encapsulation organic film TFE2 may be formed of an acryl resin, an epoxy resin, a phenolic resin, a polyamide resin, a polyimide resin, or the like.

A touch sensing unit TSL may be disposed on the encapsulation layer TFEL. The touch sensing unit TSL may include the first sensor electrodes SE1, the second sensor electrodes SE2, the first sensor lines SL1, the first sub-sensor lines SL21, and the second sub-sensor lines SL22.

A first sensor insulating film TINS1 may be disposed on the second encapsulation inorganic layer TFE3. The first sensor insulating film TINS1 may be formed as multiple films in which one or more inorganic films of a silicon nitride layer, a silicon oxynitride layer, a silicon oxide layer, a titanium oxide layer, and an aluminum oxide layer are alternately stacked. Alternatively, the first sensor insulating film TINS1 may be formed as an organic film made of an acryl resin, an epoxy resin, a phenolic resin, a polyamide resin, a polyimide resin, or the like.

The second sub-sensor lines SL22 may be disposed on the first sensor insulating film TINS1. The second sub-sensor lines SL22 may be formed as a single layer made of molybdenum (Mo), titanium (Ti), copper (Cu), or aluminum (Al) or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

A second sensor insulating film TINS2 may be disposed on the second sub-sensor lines SL22. The second sensor insulating film TINS2 may be formed as multiple films in which one or more inorganic films of a silicon nitride layer, a silicon oxynitride layer, a silicon oxide layer, a titanium oxide layer, and an aluminum oxide layer are alternately stacked. Alternatively, the second sensor insulating film TINS2 may be formed as an organic film made of an acryl resin, an epoxy resin, a phenolic resin, a polyamide resin, a polyimide resin, or the like.

The first sensor electrodes SE1, the second sensor electrodes SE2, the first sensor lines SL1, and the first sub-sensor lines SL21 may be disposed on the second sensor insulating film TINS2. Since the first sensor electrodes SE1, the second sensor electrodes SE2, the first sensor lines SL1, and the first sub-sensor lines SL21 are disposed at the same layer, the first sensor electrodes SE1, the second sensor electrodes SE2, the first sensor lines SL1, and the first sub-sensor lines SL21 may not overlap each other. Each of the first sub-sensor lines SL21 may be connected to the second sub-sensor line SL22 through the first sensor connection hole SH1 penetrating through the second sensor insulating film TINS2. The first sensor electrodes SE1, the second sensor electrodes SE2, the first sensor lines SL1, and the first sub-sensor lines SL21 may be formed as a single layer made of molybdenum (Mo), titanium (Ti), copper (Cu), or aluminum (Al) or be formed as a stacked structure (Ti/Al/Ti) of aluminum and titanium, a stacked structure (ITO/Al/ITO) of aluminum and ITO, an APC alloy, and a stacked structure (ITO/APC/ITO) of an APC alloy and ITO.

Meanwhile, it has been illustrated in FIG. 11 that the second sub-sensor lines SL22 are disposed on the first sensor insulating film TINS1 and the first sensor electrodes SE1, the second sensor electrodes SE2, the first sensor lines SL1, and the first sub-sensor lines SL21 are disposed on the second sensor insulating film TINS2, but embodiments of the present disclosure are not limited thereto. For example, the first sensor electrodes SE1, the second sensor electrodes SE2, the first sensor lines SL1, and the first sub-sensor lines SL21 may be formed on the first sensor insulating film TINS1, and the second sub-sensor lines SL22 may be disposed on the second sensor insulating film TINS2.

A third sensor insulating film TINS3 may be disposed on the first sensor electrodes SE1, the second sensor electrodes SE2, the first sensor lines SL1, and the first sub-sensor lines SL21. The third sensor insulating film TINS3 may be formed as an organic film made of an acryl resin, an epoxy resin, a phenolic resin, a polyamide resin, a polyimide resin, or the like.

Meanwhile, in the second auxiliary display area ADA2, the fourth sub-sensor lines SL32 may be disposed on the first sensor insulating film TINS1, and the third sensor electrodes SE3 and the third sub-sensor lines SL31 may be disposed on the second sensor insulating film TINS2. That is, the fourth sub-sensor lines SL32 may be formed of the same material as the second sub-sensor lines SL22 at the same layer as the second sub-sensor lines SL22. In addition, the third sensor electrodes SE3 and the third sub-sensor lines SL31 may be formed of the same material as the first sensor electrodes SE1, the second sensor electrodes SE2, the first sensor lines SL1, and the first sub-sensor lines SL21 at the same layer as the first sensor electrodes SE1, the second sensor electrodes SE2, the first sensor lines SL1, and the first sub-sensor lines SL21. In an embodiment, the sensor insulating film TINS1-3 may be considered part of the touch sensing unit TSL.

As illustrated in FIGS. 6 to 12, the second sub-sensor lines SL22 may be disposed at a different layer from the first sensor electrodes SE1, the second sensor electrodes SE2, the first sensor lines SL1, and the first sub-sensor lines SL21. Therefore, the second sub-sensor lines SL22 may be connected to the first multiplexer 210 of the sub-area SBA through the first auxiliary display area ADA1, the first main display area MDA1, and the first main non-display area MNDA1. Therefore, in an embodiment, the second sensor lines SL2 connected to the second sensor electrodes SE2 is not disposed in the first auxiliary non-display area ANDA1. Accordingly, an increase in the width of the first auxiliary non-display area ANDA1 due to the second sensor lines SL2 may be prevented.

In addition, the fourth sub-sensor lines SL32 may be disposed at a different layer from the first sensor electrodes SE1, the third sensor electrodes SE3, the first sensor lines SL1, and the third sub-sensor lines SL31. Therefore, the fourth sub-sensor lines SL32 may be connected to the second multiplexer 220 of the sub-area SBA through the second auxiliary display area ADA2, the second main display area MDA2, and the first main non-display area MNDA1. Therefore, in an embodiment, the third sensor lines SL3 connected to the third sensor electrodes SE3 is not disposed in the second auxiliary non-display area ANDA2. Accordingly, an increase in the width of the second auxiliary non-display area ANDA2 due to the third sensor lines SL3 may be prevented.

Figure 13:
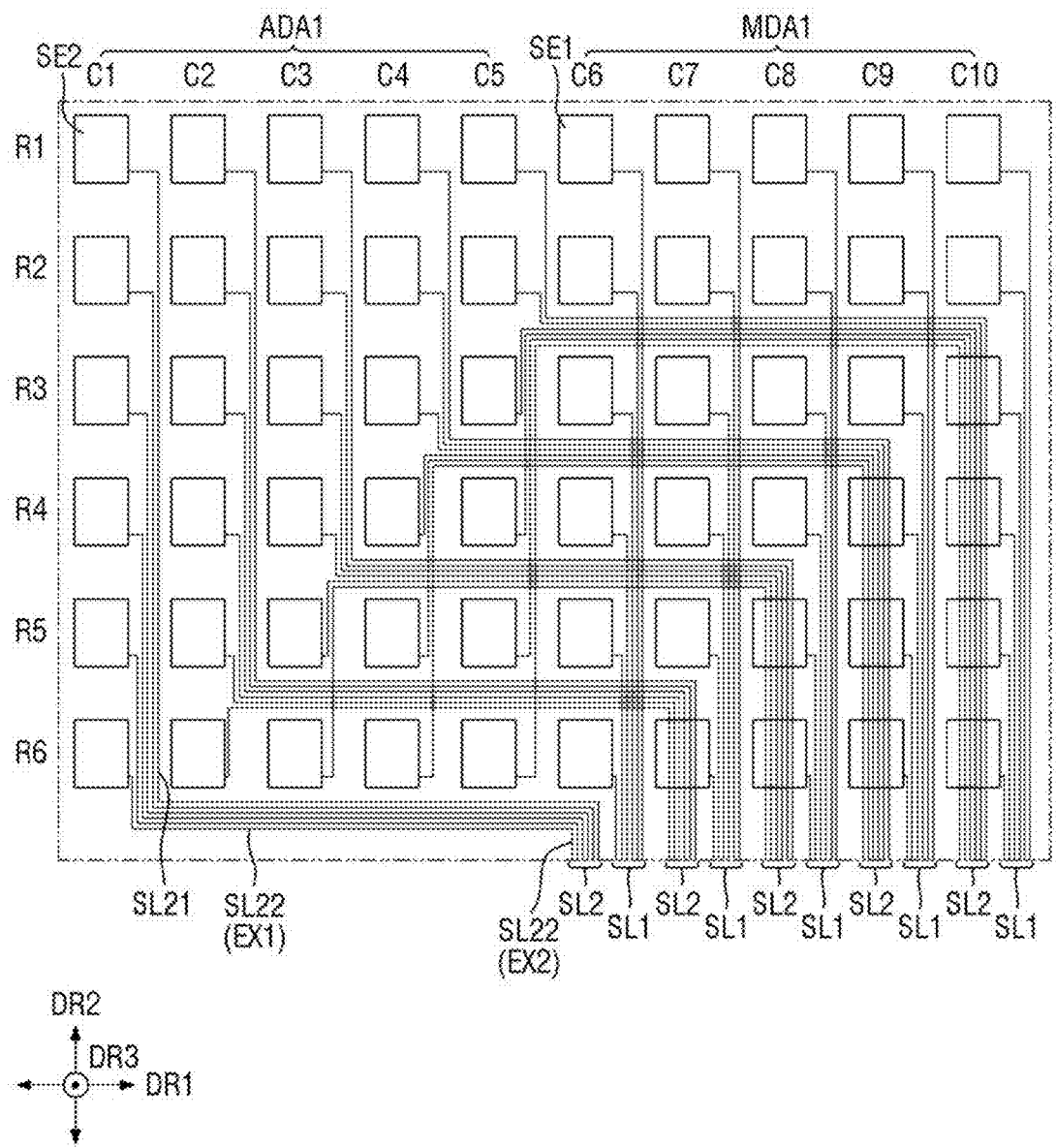
FIG. 13 is a layout diagram illustrating an example of first sensor electrodes, second sensor electrodes, first sensor lines, and second sensor lines in the first main display area and the first auxiliary display area of FIG. 5.
Figure 14:
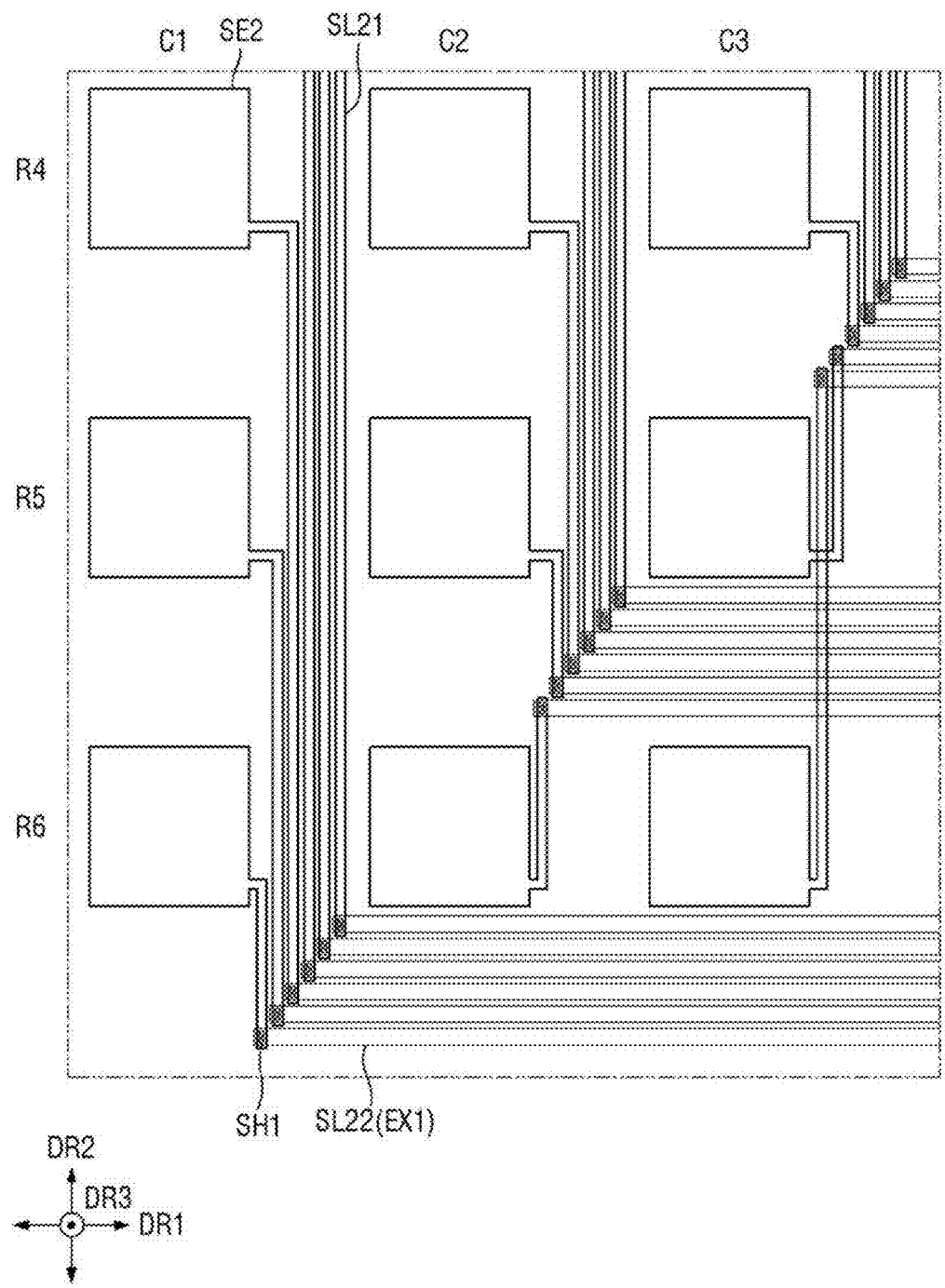
FIG. 14 is a layout diagram illustrating second sensor electrodes, first sub-sensor lines, and second sub-sensor lines disposed in fourth to sixth rows and first to third columns of FIG. 13 in detail.
Figure 15:
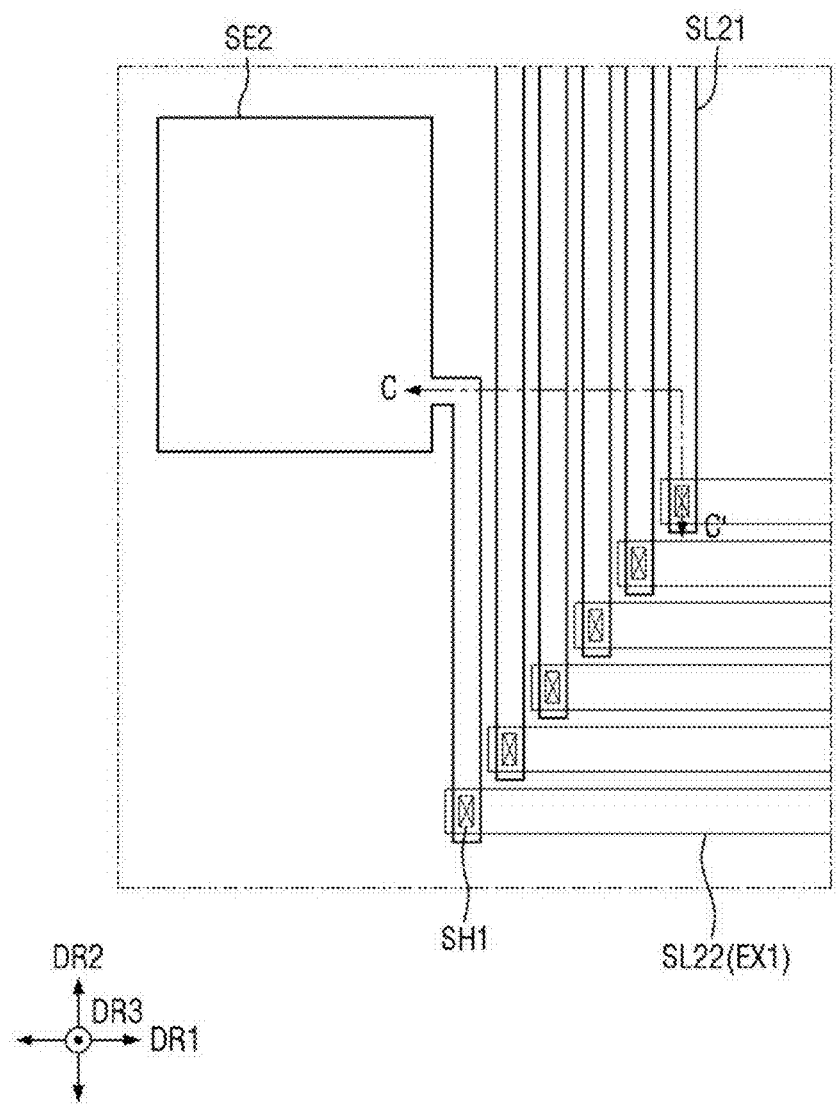
FIG. 15 is a layout diagram illustrating a second sensor electrode, first sub-sensor lines, and second sub-sensor lines disposed in the sixth row and the first column of FIG. 14 in detail.
Figure 16:
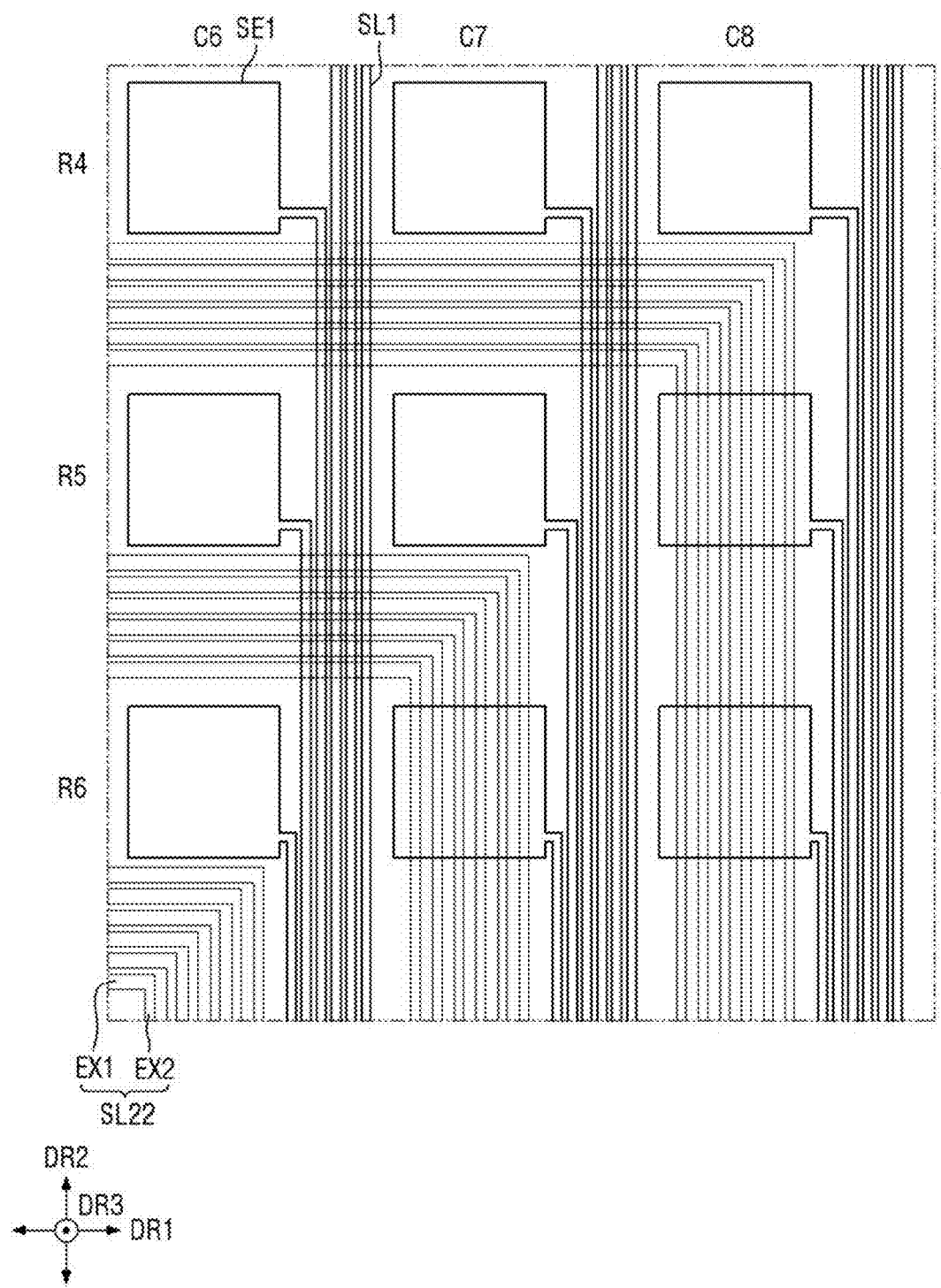
FIG. 16 is a layout diagram illustrating first sensor electrodes, first sensor lines, and second sub-sensor lines disposed in the fourth to sixth rows and sixth to eighth columns of FIG. 13 in detail.
Figure 17:
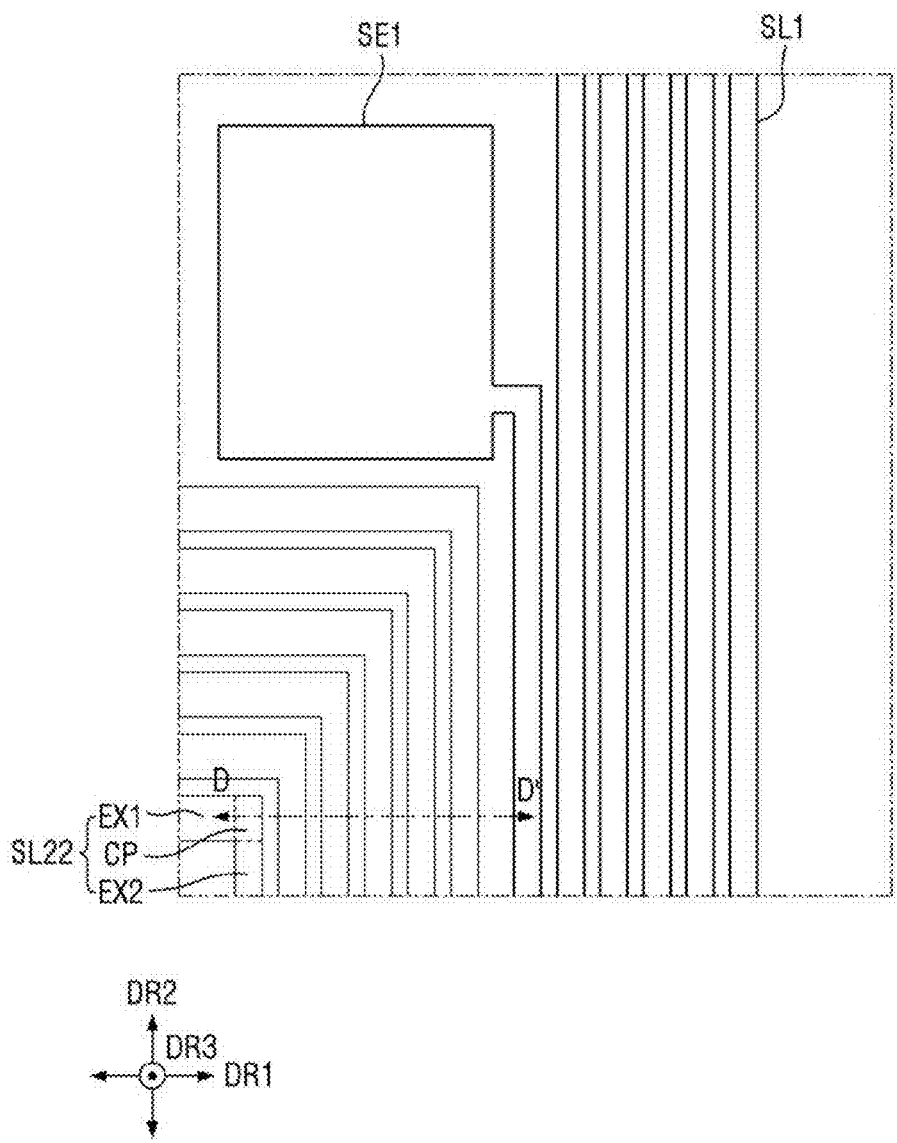
FIG. 17 is a layout diagram illustrating a first sensor electrode, first sensor lines, and second sub-sensor lines disposed in the sixth row and the sixth column of FIG. 16 in detail.

FIG. 13 is a layout diagram illustrating first sensor electrodes, second sensor electrodes, first sensor lines, and second sensor lines in a first main display area and a first auxiliary display area according to an embodiment. FIG. 14 is a layout diagram illustrating second sensor electrodes, first sub-sensor lines, and second sub-sensor lines disposed in fourth to sixth rows and first to third columns of FIG. 13 in detail. FIG. 15 is a layout diagram illustrating a second sensor electrode, first sub-sensor lines, and second sub-sensor lines disposed in the sixth row and the first column of FIG. 14 in detail. FIG. 16 is a layout diagram illustrating first sensor electrodes, first sensor lines, and second sub-sensor lines disposed in the fourth to sixth rows and sixth to eighth columns of FIG. 13 in detail. FIG. 17 is a layout diagram illustrating a first sensor electrode, first sensor lines, and second sub-sensor lines disposed in the sixth row and the sixth column of FIG. 16 in detail.

The embodiment of FIGS. 13 to 17 is different from the embodiment of FIGS. 6 to 10 in that the second sensor electrodes SE2 do not overlap the second sub-sensor lines SL22 in the first auxiliary display area ADA1. In FIGS. 13 to 17, a description overlapping that of an embodiment of FIGS. 6 to 10 will be omitted.

Referring to FIGS. 13 to 17, a length of each of the first sensor electrodes SE1 in the first direction DR1 may be substantially the same as a length of each of the first sensor electrodes SE1 in the second direction DR2, but embodiments of the present disclosure are not limited thereto. For example, a length of each of the first sensor electrodes SE1 in the first direction DR1 may be different from a length of each of the first sensor electrodes SE1 in the second direction DR2. When the length of each of the first sensor electrodes SE1 in the first direction DR1 is substantially the same as the length of each of the first sensor electrodes SE1 in the second direction DR2, each of the first sensor electrodes SE1 may have a square shape in a plan view. Alternately, when the length of each of the first sensor electrodes SE1 in the first direction DR1 is different from the length of each of the first sensor electrodes SE1 in the second direction DR2, each of the first sensor electrodes SE1 may have a rectangular shape in a plan view.

A length of each of the second sensor electrodes SE2 in the first direction DR1 may be substantially the same as a length of each of the second sensor electrodes SE2 in the second direction DR2, but embodiments of the present disclosure are not limited thereto. For example, a length of each of the second sensor electrodes SE2 in the first direction DR1 may be different from a length of each of second sensor electrodes SE2 in the second direction DR2. When the length of each of the second sensor electrodes SE2 in the first direction DR1 is substantially the same as the length of each of the second sensor electrodes SE2 in the second direction DR2, each of the second sensor electrodes SE2 may have a square shape in a plan view. Alternately, when the length of each of the second sensor electrodes SE2 in the first direction DR1 is different from the length of each of the second sensor electrodes SE2 in the second direction DR2, each of the second sensor electrodes SE2 may have a rectangular shape in a plan view.

The first sensor lines SL1 are substantially the same as those of an embodiment of FIGS. 6 to 10, and a description therefor will thus be omitted.

The second sensor lines SL2 may include first sub-sensor lines SL21 extending in the second direction DR2 and second sub-sensor lines SL22 extending in the first direction DR1.

The first sub-sensor lines SL21 are substantially the same as those of an embodiment of FIGS. 6 to 10, and a description therefor will thus be omitted.

In an embodiment, the first extending portion EX1 of each of the second sub-sensor lines SL22 disposed in the third to sixth rows R3 to R6 do not overlap the second sensor electrodes SE2 in the third direction DR3. For example, the first extending portion EX1 of each of the second sub-sensor lines SL22 disposed in the sixth row R6 may not overlap the second sensor electrodes SE2 disposed in the sixth row R6 in the second to fifth columns C2 to C5, in the third direction DR3. In an embodiment, the first extending portion EX1 of each of the second sub-sensor lines SL22 disposed in the fifth row R5 does not overlap the second sensor electrodes SE2 disposed in the fifth row R5 in the third to fifth columns C3 to C5, in the third direction DR3. The first extending portion EX1 of each of the second sub-sensor lines SL22 disposed in the fourth row R4 may not overlap the second sensor electrodes SE2 disposed in the fourth row R4 in the fourth and fifth columns C4 and C5, in the third direction DR3. In an embodiment, the first extending portion EX1 of each of the second sub-sensor lines SL22 disposed in the third row R3 does not overlap the second sensor electrodes SE2 disposed in the third row R3 in the fifth columns C5, in the third direction DR3.

In addition, the curved portion CP of each of the second sub-sensor lines SL22 may not overlap the first sensor electrode SE1.

Referring to FIGS. 13 to 17, the second sub-sensor lines SL22 do not overlap the second sensor electrodes SE2, and thus, parasitic capacitance between the second sensor electrodes SE2 and the second sub-sensor lines SL22 may be minimized. Therefore, an influence of the second sub-sensor lines SL22 on each of the second sensor electrodes SE2 may be minimized.

Meanwhile, the first sensor electrodes SE1, the third sensor electrodes SE3, the first sensor lines SL1, and the third sensor lines SL3 in the second main display area MDA2 and the second auxiliary display area ADA2 are substantially the same as the first sensor electrodes SE1, the second sensor electrodes SE2, the first sensor lines SL1, and the second sensor lines SL2 in the first main display area MDA1 and the first auxiliary display area ADA1 described with reference to FIGS. 13 to 17, and a description therefor will thus be omitted.

Figure 18:
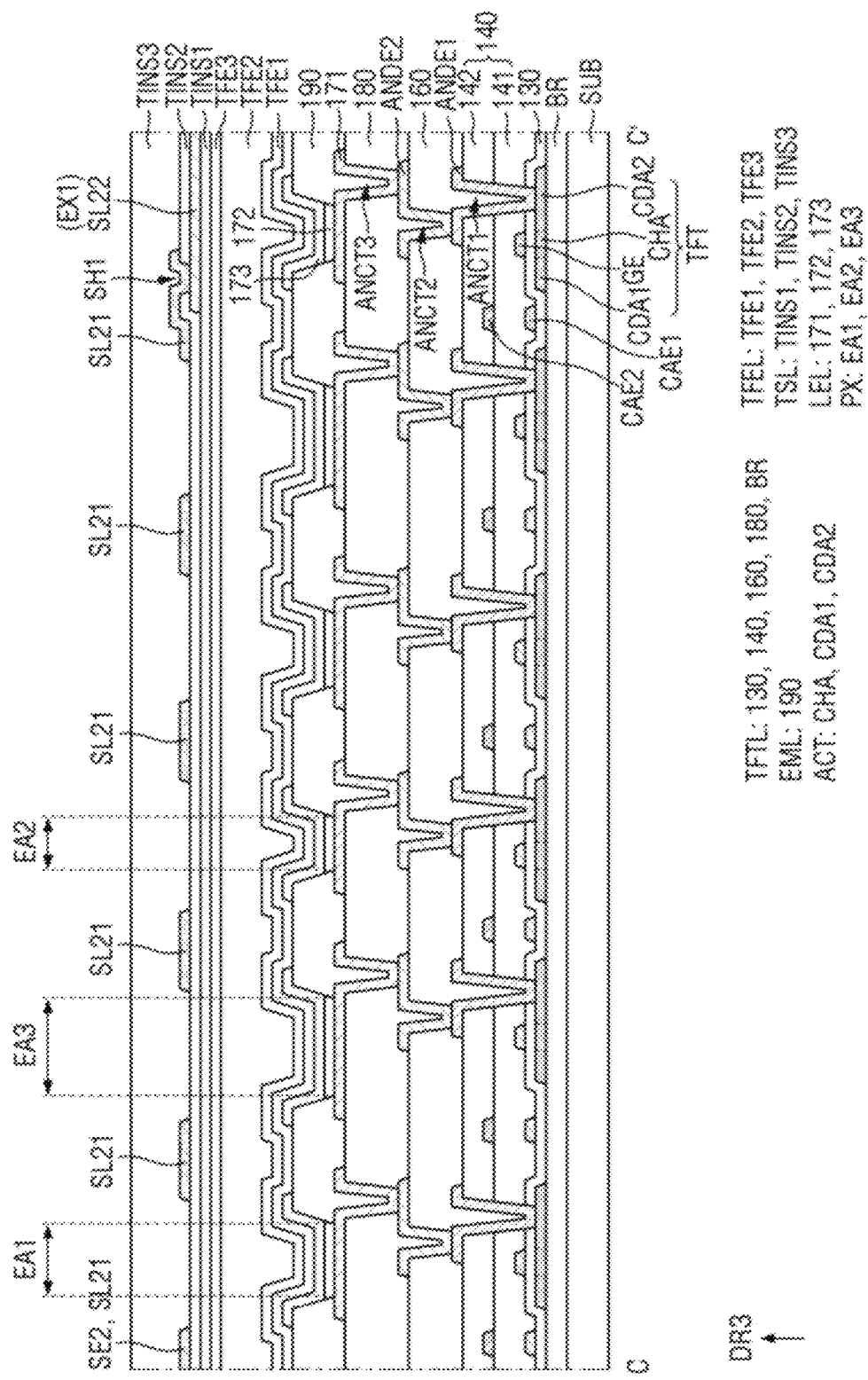
FIG. 18 is a cross-sectional view illustrating an example of the display panel taken along line C-C' of FIG. 15.
Figure 19:
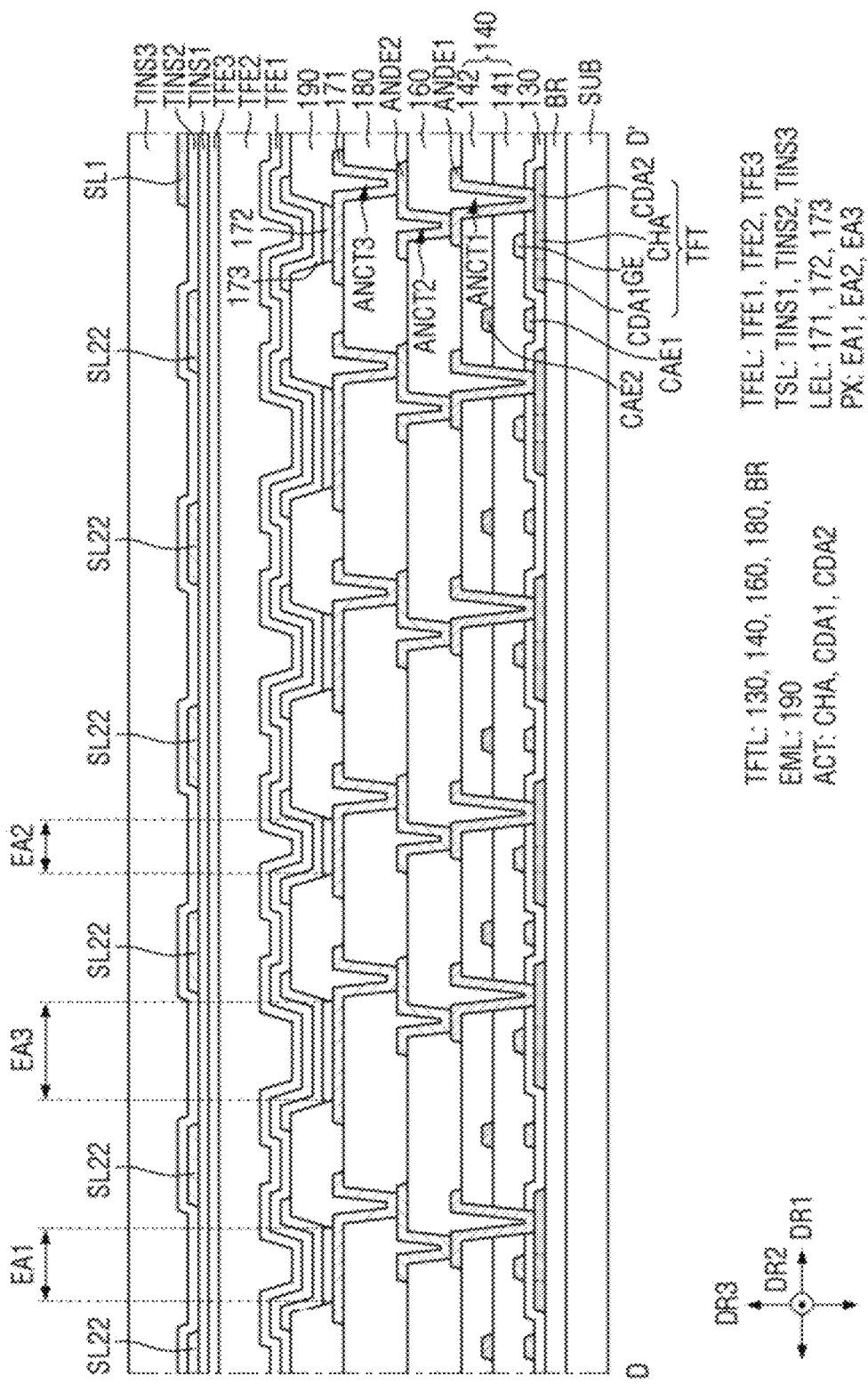
FIG. 19 is a cross-sectional view illustrating an example of the display panel taken along line D-D' of FIG. 17.

FIG. 18 is a cross-sectional view illustrating an example of the display panel taken along line C-C' of FIG. 15. FIG. 19 is a cross-sectional view illustrating an example of the display panel taken along line D-D' of FIG. 17.

In an embodiment of FIGS. 18 and 19, layers at which the first sensor electrodes SE1, the second sensor electrodes SE2, the first sensor lines SL1, the first sub-sensor lines SL21, and the second sub-sensor lines SL22 are disposed are substantially the same as those of an embodiment of FIGS. 11 and 12, and a description therefor will thus be omitted.

Figure 20:
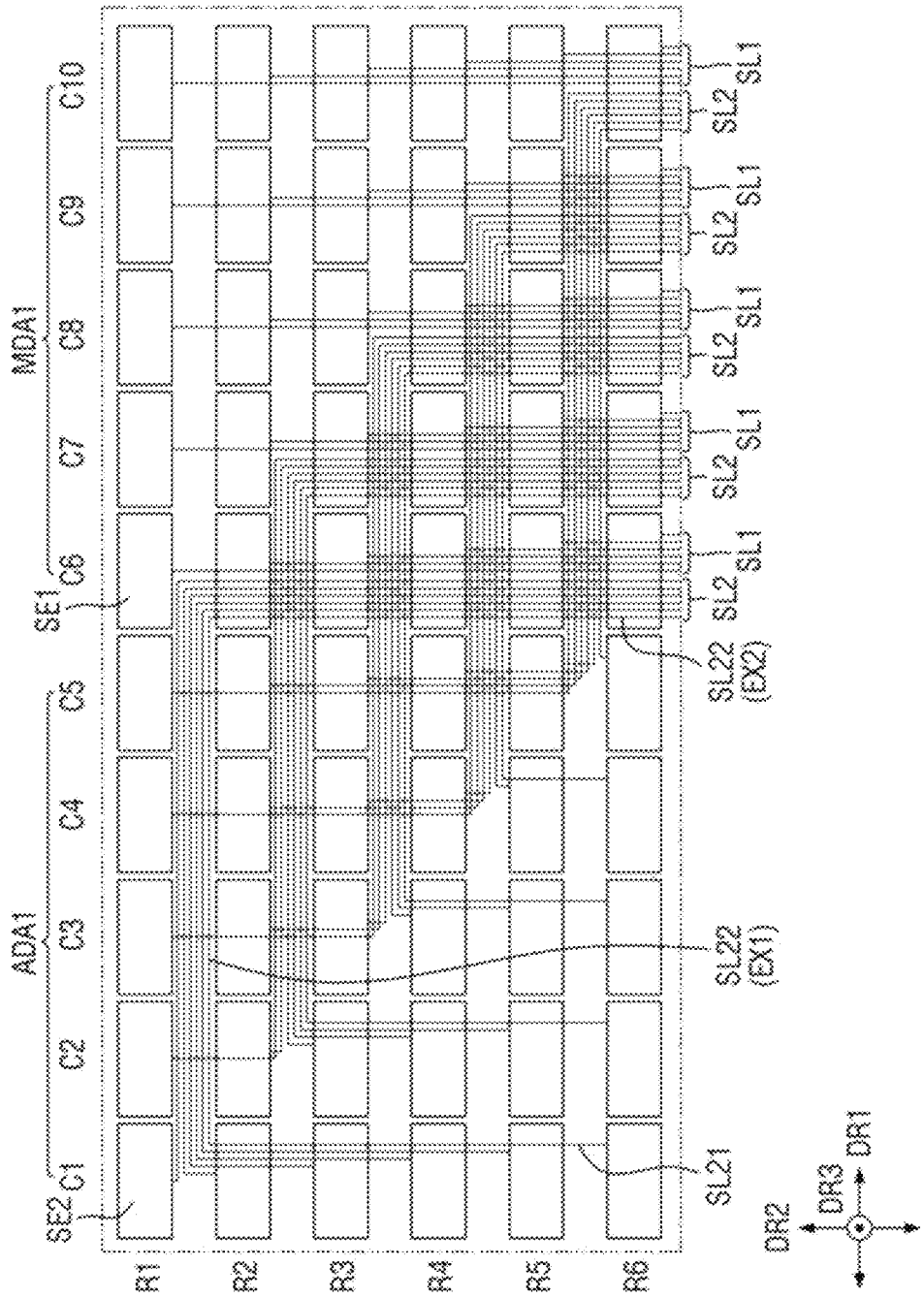
FIG. 20 is a layout diagram illustrating still another example of first sensor electrodes, second sensor electrodes, first sensor lines, and second sensor lines in the first main display area and the first auxiliary display area of FIG. 5.
Figure 21:
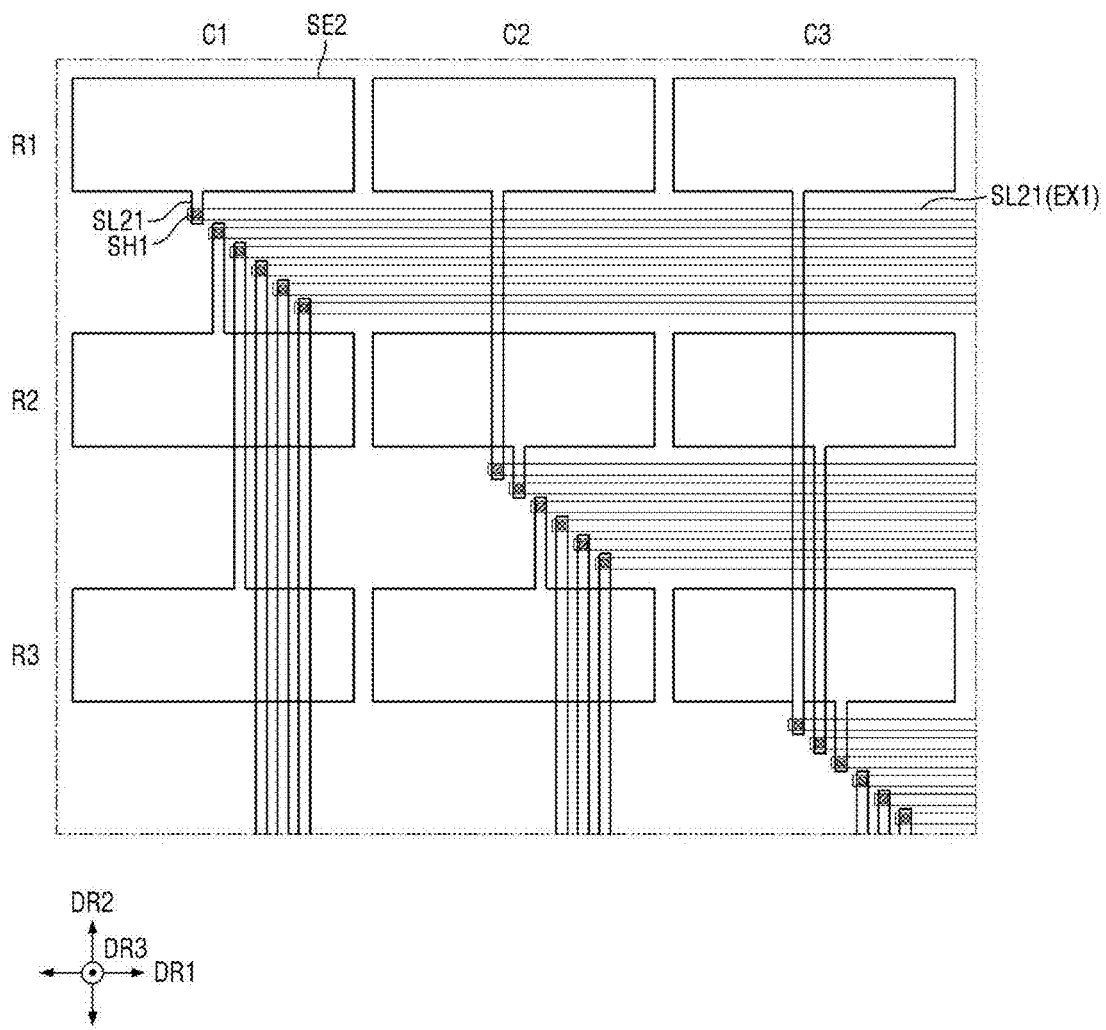
FIG. 21 is a layout diagram illustrating second sensor electrodes, first sub-sensor lines, and second sub-sensor lines disposed in first to third rows and first to third columns of FIG. 20 in detail.
Figure 23:
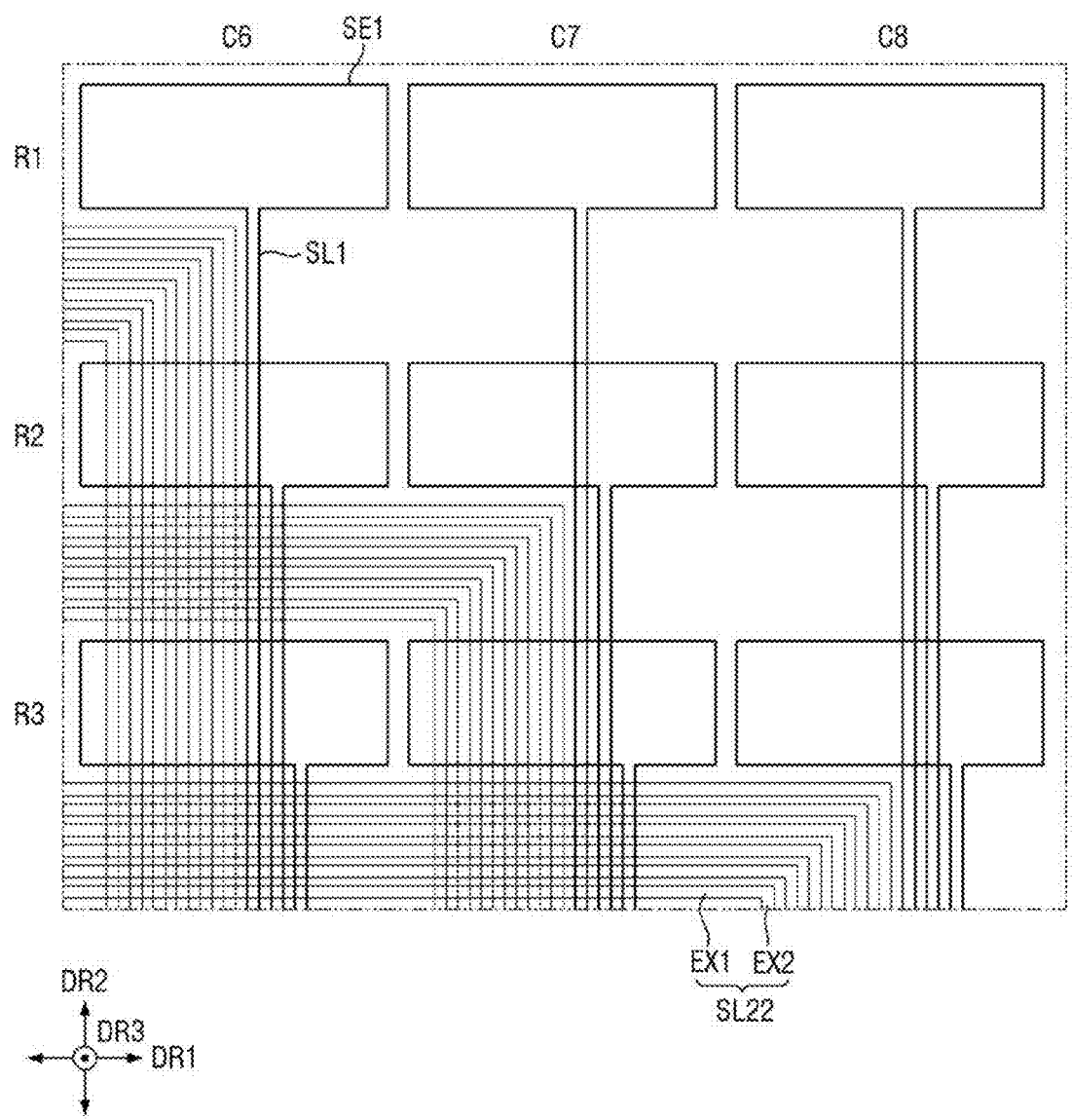
FIG. 23 is a layout diagram illustrating first sensor electrodes, first sensor lines, and second sub-sensor lines disposed in the first to third rows and sixth to eighth columns of FIG. 20 in detail.
Figure 24:
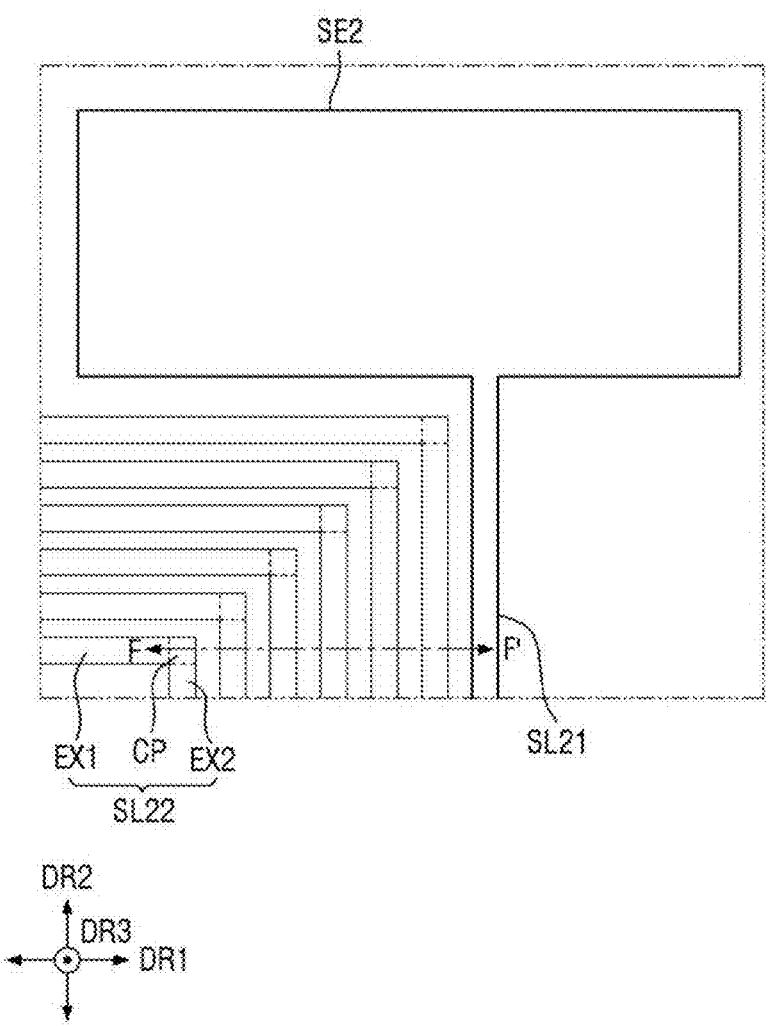
FIG. 24 is a layout diagram illustrating a first sensor electrode, first sensor lines, and second sub-sensor lines disposed in the first row and the sixth column of FIG. 23 in detail.

FIG. 20 is a layout diagram illustrating first sensor electrodes, second sensor electrodes, first sensor lines, and second sensor lines in a first main display area and a first auxiliary display area according to still another embodiment. FIG. 21 is a layout diagram illustrating second sensor electrodes, first sub-sensor lines, and second sub-sensor lines disposed in first to third rows and first to third columns of FIG. 20 in detail. FIG. 22 is a layout diagram illustrating a second sensor electrode, first sub-sensor lines, and second sub-sensor lines disposed in the first row and the first column of FIG. 21 in detail. FIG. 23 is a layout diagram illustrating first sensor electrodes, first sensor lines, and second sub-sensor lines disposed in the first to third rows and sixth to eighth columns of FIG. 20 in detail. FIG. 24 is a layout diagram illustrating a first sensor electrode, first sensor lines, and second sub-sensor lines disposed in the first row and the sixth column of FIG. 23 in detail.

The embodiment of FIGS. 20 to 24 is different from the embodiment of FIGS. 6 to 10 in that the second sensor electrodes SE2 overlap the first sub-sensor lines SL21, but do not overlap the second sub-sensor lines SL22, in the first auxiliary display area ADA1. In FIGS. 20 to 24, a description overlapping that of an embodiment of FIGS. 6 to 10 will be omitted.

Referring to FIGS. 20 to 24, in an embodiment, a length of each of the first sensor electrodes SE1 in the first direction DR1 is greater than a length of each of the first sensor electrodes SE1 in the second direction DR2. In an embodiment, a distance between the first sensor electrodes SE1 neighboring each other in the first direction DR1 is smaller than a distance between the first sensor electrodes SE1 neighboring each other in the second direction DR2.

In an embodiment, a length of each of the second sensor electrodes SE2 in the first direction DR1 is greater than a length of each of the second sensor electrodes SE2 in the second direction DR2. In an embodiment, a distance between the second sensor electrodes SE2 neighboring each other in the first direction DR1 is smaller than a distance between the second sensor electrodes SE2 neighboring each other in the second direction DR2.

The first sensor lines SL1 may extend in the second direction DR2. The first sensor lines SL1 may be connected to the first sensor electrodes SE1 in a one-to-one manner. Each of the first sensor lines SL1 connected to the first sensor electrodes SE1 of the first to fifth rows R1 to R5 in each of the sixth to tenth columns C6 to C10 may overlap at least one first sensor electrode SE1.

For example, the first sensor lines SL1 connected to the first sensor electrode SE1 of the first row R1 in each of the sixth to tenth columns C6 to C10 may overlap the first sensor electrodes SE1 of the second to sixth rows R2 to R6. The first sensor lines SL1 connected to the first sensor electrode SE1 of the second row R2 in each of the sixth to tenth columns C6 to C10 may overlap the first sensor electrodes SE1 of the third to sixth rows R3 to R6. The first sensor lines SL1 connected to the first sensor electrode SE1 of the third row R3 in each of the sixth to tenth columns C6 to C10 may overlap the first sensor electrodes SE1 of the fourth to sixth rows R4 to R6. The first sensor lines SL1 connected to the first sensor electrode SE1 of the fourth row R4 in each of the sixth to tenth columns C6 to C10 may overlap the first sensor electrodes SE1 of the fifth and sixth rows R5 and R6. The first sensor lines SL1 connected to the first sensor electrode SE1 of the fifth row R5 in each of the sixth to tenth columns C6 to C10 may overlap the first sensor electrode SE1 of the sixth row R6.

The second sensor lines SL2 may include first sub-sensor lines SL21 extending in the second direction DR2 and second sub-sensor lines SL22 extending in the first direction DR1.

The first sub-sensor lines SL21 may extend in the second direction DR2. The first sub-sensor lines SL21 may be connected to the second sensor electrodes SE2 in a one-to-one manner. Each of the first sub-sensor lines SL21 connected to the second sensor electrodes SE2 of the first to fifth rows R1 to R5 in each of the first and fifth columns C1 to C5 may overlap at least one first second electrode SE2.

For example, the first sub-sensor lines SL21 connected to the second sensor electrode SE2 of the first row R1 in each of the first to fifth columns C1 to C5 may overlap the second sensor electrodes SE2 of the second to sixth rows R2 to R6. The first sub-sensor lines SL21 connected to the second sensor electrode SE2 of the second row R2 in each of the first to fifth columns C1 to C5 may overlap the second sensor electrodes SE2 of the third to sixth rows R3 to R6. The first sub-sensor lines SL21 connected to the second sensor electrode SE2 of the third row R3 in each of the first to fifth columns C1 to C5 may overlap the second sensor electrodes SE2 of the fourth to sixth rows R4 to R6. The first sub-sensor lines SL21 connected to the second sensor electrode SE2 of the fourth row R4 in each of the first to fifth columns C1 to C5 may overlap the second sensor electrodes SE2 of the fifth and sixth rows R5 and R6. The first sub-sensor lines SL21 connected to the second sensor electrode SE2 of the fifth row R5 in each of the first to fifth columns C1 to C5 may overlap the second sensor electrode SE2 of the sixth row R6.

Each of the second sub-sensor lines SL22 may include a first extending portion EX1 extending in the first direction DR1 in the first auxiliary display area ADA1, a second extending portion EX2 extending in the second direction DR2 in the first main display area MDA1, and a curved portion CP curved from the first direction DR1 to the second direction DR2 in the first main display area MDA1.

The first extending portion EX1 may be disposed in the first main display area MDA1 and the first auxiliary display area ADA1. The second extending portion EX2 may be disposed in the first main display area MDA1. A width of the first extending portion EX1 and a width of the second extending portion EX2 may be substantially the same as each other, but embodiments of the present disclosure are not limited thereto.

The curved portion CP may be disposed between the first extending portion EX1 and the second extending portion EX2. In an embodiment, the curved portion CP does not overlap the first sensor electrode SE1.

The second sub-sensor lines SL22 may be connected to the first sub-sensor lines SL21 in a one-to-one manner. The second sub-sensor lines SL22 may be disposed in the first to fifth rows R1 to R5. For example, the second sub-sensor lines SL22 disposed in the first row R1 may be connected to the first sub-sensor lines SL21 disposed in the first column C1, in a one-to-one manner. The first extending portion EX1 of each of the second sub-sensor lines SL22 disposed in the first row R1 may be connected to the first sub-sensor lines SL21 through the first sensor connection hole SH1.

In addition, the second sub-sensor lines SL22 disposed in the second row R2 may be connected to the first sub-sensor lines SL21 disposed in the second column C2, in a one-to-one manner. The second sub-sensor lines SL22 disposed in the third row R3 may be connected to the first sub-sensor lines SL21 disposed in the third column C3, in a one-to-one manner. The second sub-sensor lines SL22 disposed in the fourth row R4 may be connected to the first sub-sensor lines SL21 disposed in the fourth column C4, in a one-to-one manner. The second sub-sensor lines SL22 disposed in the fifth row R5 may be connected to the first sub-sensor lines SL21 disposed in the fifth column C5, in a one-to-one manner.

It has been illustrated in FIGS. 20 to 24 that the second sub-sensor lines SL22 are disposed in the first to fifth rows R1 to R5 in the first auxiliary display area ADA1, but embodiments of the present disclosure are not limited thereto. The second sub-sensor lines SL22 may also be disposed in the second to sixth rows R2 to R6 in the first auxiliary display area ADA1.

In addition, each of the second sub-sensor lines SL22 may not overlap the second sensor electrodes SE2 in the third direction DR3. For example, the second sub-sensor lines SL22 of the first row R1 may be disposed between the second sensor electrodes SE2 of the first row R1 and the second sensor electrode SE2 of the second row R2. That is, the second sub-sensor lines SL22 of the first row R1 may be disposed on the lower side of the second sensor electrodes SE2 of the first row R1.

In addition, the second sub-sensor lines SL22 of the second row R2 may be disposed between the second sensor electrodes SE2 of the second row R2 and the second sensor electrode SE2 of the third row R3. The second sub-sensor lines SL22 of the third row R3 may be disposed between the second sensor electrodes SE2 of the third row R3 and the second sensor electrode SE2 of the fourth row R4. The second sub-sensor lines SL22 of the fourth row R4 may be disposed between the second sensor electrodes SE2 of the fourth row R4 and the second sensor electrode SE2 of the fifth row R5. The second sub-sensor lines SL22 of the fifth row R5 may be disposed between the second sensor electrodes SE2 of the fifth row R5 and the second sensor electrode SE2 of the sixth row R6.

In addition, each of the second sub-sensor lines SL22 may intersect at least one first sub-sensor line SL21 connected to the second sensor electrode SE2 in the second to fifth columns C2 to C5. For example, the first extending portion EX1 of each of the second sub-sensor lines SL22 disposed in the first row R1 may intersect the first sub-sensor lines SL21 disposed in the second to fifth columns C2 to C5. The first extending portion EX1 of each of the second sub-sensor lines SL22 disposed in the second row R2 may intersect the first sub-sensor lines SL21 disposed in the third to fifth columns C3 to C5. The first extending portion EX1 of each of the second sub-sensor lines SL22 disposed in the third row R3 may intersect the first sub-sensor lines SL21 disposed in the fourth and fifth columns C4 and C5. The first extending portion EX1 of each of the second sub-sensor lines SL22 disposed in the fourth row R4 may intersect the first sub-sensor lines SL21 disposed in the fifth column C5. In this embodiment, the number of first sub-sensor lines SL21 that the second sub-sensor lines SL22 intersect may decrease from the first row R1 toward the fourth row R4.

In addition, the second sub-sensor lines SL22 may overlap the first sensor electrodes SE1 disposed in the sixth to tenth columns C6 to C10, in the third direction DR3. For example, the second extending portion EX2 of each of the second sub-sensor lines SL22 disposed in the sixth column C6 may overlap the first sensor electrodes SE1 in the third direction DR3. The second extending portion EX2 of each of the second sub-sensor lines SL22 disposed in the seventh column C7 may overlap the first sensor electrodes SE1 in the third direction DR3. The second extending portion EX2 of each of the second sub-sensor lines SL22 disposed in the eighth column C8 may overlap the first sensor electrodes SE1 in the third direction DR3. The second extending portion EX2 of each of the second sub-sensor lines SL22 disposed in the ninth column C9 may overlap the first sensor electrodes SE1 in the third direction DR3. The second extending portion EX2 of each of the second sub-sensor lines SL22 disposed in the tenth column C10 may overlap the first sensor electrode SE1 in the third direction DR3. In this embodiment, the number of first sensor electrodes SE1 that the second sub-sensor lines SL22 overlap in the third direction DR3 may decrease from the sixth row C6 toward the tenth row C10.

In addition, the second sub-sensor lines SL22 may intersect the first sensor lines SL1 connected to the first sensor electrodes SE1 disposed in the sixth to ninth columns C6 to C9. For example, the first extending portion EX1 of each of the second sub-sensor lines SL22 disposed in the second row R2 may intersect the first sensor lines SL1 connected to the first sensor electrode SE1 disposed in the sixth column C6. The first extending portion EX1 of each of the second sub-sensor lines SL22 disposed in the third row R3 may intersect the first sensor lines SL1 connected to the first sensor electrode SE1 disposed in the sixth and seventh columns C6 and C7. The first extending portion EX1 of each of the second sub-sensor lines SL22 disposed in the fourth row R4 may intersect the first sensor lines SL1 connected to the first sensor electrode SE1 disposed in the sixth to eighth columns C6 to C8. The first extending portion EX1 of each of the second sub-sensor lines SL22 disposed in the fifth row R5 may intersect the first sensor lines SL1 connected to the first sensor electrode SE1 disposed in the sixth to ninth columns C6 to C9. In this embodiment, the number of first sensor lines SL1 that the second sub-sensor lines SL22 intersect may increase from the sixth row C6 toward the ninth row C9.

In addition, each of the second sub-sensor lines SL22 may include at least one curved portion CP curved from the first direction DR1 to the second direction DR2 in the first main display area MDA1. In an embodiment, the curved portion CP of each of the second sub-sensor lines SL22 does not overlap the first sensor electrode SE1. In an embodiment, the curved portion CP is shaped like a right angle, but is not limited thereto.

Meanwhile, the first sensor electrodes SE1, the third sensor electrodes SE3, the first sensor lines SL1, and the third sensor lines SL3 in the second main display area MDA2 and the second auxiliary display area ADA2 are substantially the same as the first sensor electrodes SE1, the second sensor electrodes SE2, the first sensor lines SL1, and the second sensor lines SL2 in the first main display area MDA1 and the first auxiliary display area ADA1 described with reference to FIGS. 20 to 24, and a description therefor will thus be omitted.

Figure 25:
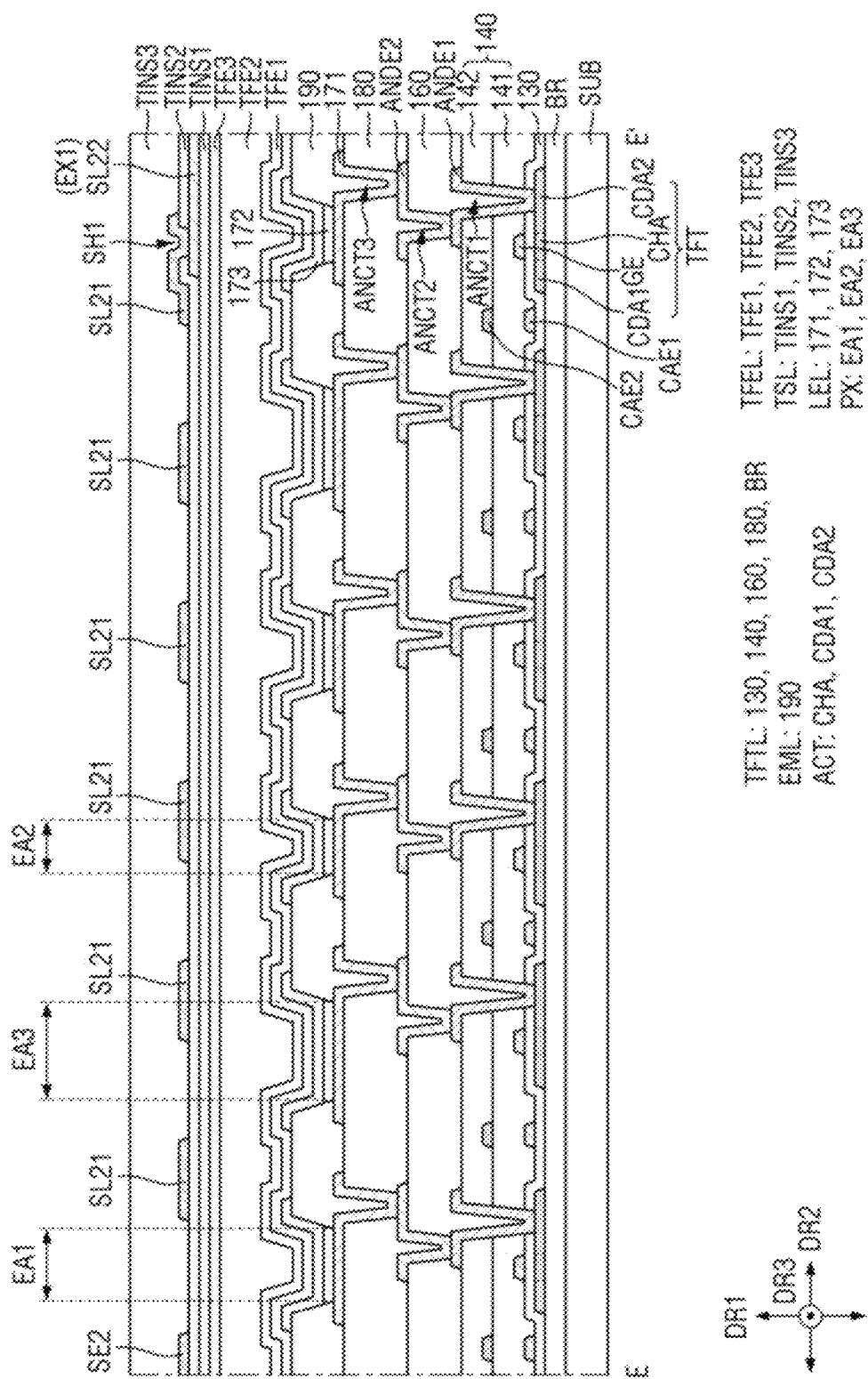
FIG. 25 is a cross-sectional view illustrating an example of the display panel taken along line E-E' of FIG. 22.
Figure 26:
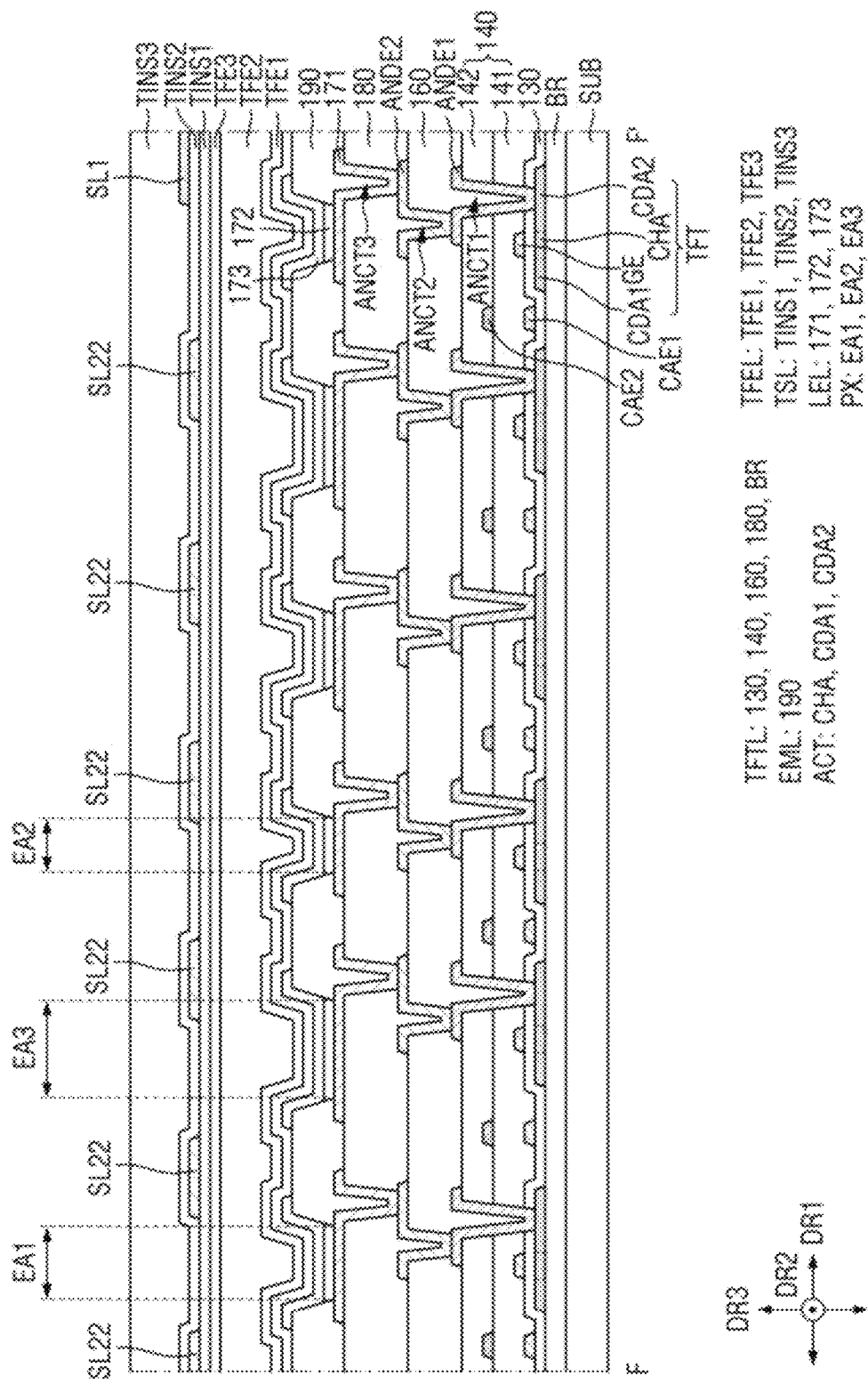
FIG. 26 is a cross-sectional view illustrating an example of the display panel taken along line F-F' of FIG. 25.

FIG. 25 is a cross-sectional view illustrating an example of the display panel taken along line E-E' of FIG. 22. FIG. 26 is a cross-sectional view illustrating an example of the display panel taken along line F-F' of FIG. 25.

In an embodiment of FIGS. 25 and 26, layers at which the first sensor electrodes SE1, the second sensor electrodes SE2, the first sensor lines SL1, the first sub-sensor lines SL21, and the second sub-sensor lines SL22 are disposed are substantially the same as those of an embodiment of FIGS. 11 and 12, and a description therefor will thus be omitted.

As illustrated in FIGS. 20 to 26, the second sub-sensor lines SL22 may be disposed at a different layer from the first sensor electrodes SE1, the second sensor electrodes SE2, the first sensor lines SL1, and the first sub-sensor lines SL21. Therefore, the second sub-sensor lines SL22 may be connected to the first multiplexer 210 of the sub-area SBA through the first auxiliary display area ADA1, the first main display area MDA1, and the first main non-display area MNDA1. Therefore, in an embodiment, the second sensor lines SL2 connected to the second sensor electrodes SE2 are not disposed in the first auxiliary non-display area ANDA1. Accordingly, an increase in the width of the first auxiliary non-display area ANDA1 due to the second sensor lines SL2 may be prevented.

In addition, the fourth sub-sensor lines SL32 may be disposed at a different layer from the first sensor electrodes SE1, the third sensor electrodes SE3, the first sensor lines SL1, and the third sub-sensor lines SL31. Therefore, the fourth sub-sensor lines SL32 may be connected to the second multiplexer 220 of the sub-area SBA through the second auxiliary display area ADA2, the second main display area MDA2, and the first main non-display area MNDA1. Therefore, in an embodiment, the third sensor lines SL3 connected to the third sensor electrodes SE3 is not disposed in the second auxiliary non-display area ANDA2. Accordingly, an increase in the width of the second auxiliary non-display area ANDA2 due to the third sensor lines SL3 may be prevented.

In a touch sensing unit and a display device including an embodiment of the present disclosure, the second sub-sensor lines may be disposed at a different layer from the first sensor electrodes, the second sensor electrodes, the first sensor lines, and the first sub-sensor lines. Therefore, the second sub-sensor lines may be connected to a multiplexer of the sub-area through an auxiliary display area, a main display area, and a first main non-display area. Accordingly, in an embodiment, the second sensor lines connected to the second sensor electrodes are not disposed in an auxiliary non-display area. Accordingly, an increase in a width of the auxiliary non-display area due to the second sensor lines may be prevented.

While the present disclosure has been particularly shown and described with reference to embodiments thereof, it will be understood by those of ordinary skill in the art that various changes in form and detail may be made therein without departing from the spirit and scope of the present disclosure as defined by the following claims. The embodiments of the present disclosure described herein should be considered in a descriptive sense only and not for purposes of limitation.

What is claimed is:

1. A display device comprising:
   a main area; and
   a first auxiliary area disposed on a first side of the main area and protruding from the main area in a first direction, and a first roller disposed under the first auxiliary area, configured to move in the first direction, and having a rotation axis in a second direction,
   wherein a portion of the first auxiliary area is bent downward with respect to the main area to overlap the main area during a first state, and
   wherein the first auxiliary area does not overlap the main area during a second state,
   wherein the first auxiliary area comprises a first auxiliary display area and a first auxiliary non-display area,
   wherein the display device further comprises sensor lines, where each sensor line is connected to a corresponding sensor electrode among sensor electrodes in the first auxiliary display area, extends across the first auxiliary display area to a main display area of the main area without passing through the first auxiliary non-display area.

2. The display device of claim 1, wherein when the first roller is rotated in a first rotation direction and moves to one side in the first direction, the display device is switched from the first state to the second state, and when the first roller is rotated in a second rotation direction and moves to the other side in the first direction, the display device is switched from the second state to the first state.

3. The display device of claim 1, further comprising:
a plurality of first sensor electrodes disposed in the main area;
the sensor electrodes as a plurality of second sensor electrodes disposed in the first auxiliary area;
a plurality of first sensor lines each connected to the first sensor electrodes in the main area;
the sensor lines as a plurality of second sensor lines each connected to the second sensor electrodes in the first auxiliary area.

4. The display device of claim 1, further comprising:
a second auxiliary area disposed on a second side of the main area and protruding from the main area in the first direction; and
a second roller disposed under the second auxiliary area, configured to move in the first direction, and having a rotation axis in the second direction, wherein a portion of the second auxiliary area is bent downward with respect to the main area to overlap the main area during a first state, and wherein the second auxiliary area does not overlap the main area during the second state.

5. The display device of claim 4, wherein when the second roller is rotated in a second rotation direction and moves to the other side in the first direction, the display device is switched from the first state to the second state, and when the second roller is rotated in a first rotation direction and moves to one side in the first direction, the display device is switched from the second state to the first state.

6. The display device of claim 3, further comprising:
a sub-area disposed on a second side of the main area and protruding from the main area in a second direction intersecting the first direction; and
a multiplexer disposed in the sub-area and connected to the plurality of first sensor lines and the plurality of second sensor lines.

7. The display device of claim 6, wherein each of the plurality of second sensor lines comprises:
a first sub-sensor line disposed in the first auxiliary area; and
a second sub-sensor line disposed in the main area and the first auxiliary area and connected to the first sub-sensor line.

8. The display device of claim 7, wherein the second sub-sensor line is connected to the multiplexer.

9. The display device of claim 7, wherein the second sub-sensor line overlaps at least one first sensor electrode of the plurality of first sensor electrodes.

10. The display device of claim 7, wherein a first sensor line of the plurality of first sensor lines does not overlap the plurality of first sensor electrodes.

11. The display device of claim 7, wherein the second sub-sensor line intersects at least one of the first sensor line in the first area.

12. The display device of claim 7, wherein each of the first sensor electrode and the second sensor electrode has a smaller length in the first direction than in the second direction.

13. The display device of claim 7, wherein the second sub-sensor line overlaps at least one second sensor electrode of the plurality of second sensor electrodes in the second area.

14. The display device of claim 7, wherein the second sub-sensor line does not overlap the plurality of second sensor electrodes in the second area.

15. The display device of claim 14, wherein each of the first sensor electrode and the second sensor electrode has a greater length in the first direction than in the second direction intersecting the first direction.

16. The display device of claim 6, further comprising: a plurality of pixels and a plurality of data lines disposed in the main area and the first auxiliary area for displaying images.

17. The display device of claim 16, further comprising: a display driver electrically connected to the plurality of data lines to output data voltages.

18. The display device of claim 17, wherein the display driver is disposed in the sub-area.

19. The display device of claim 6, wherein the multiplexer connects a plurality of first sensor lines and a plurality of second sensor lines to a plurality of pad lines connected to a plurality of pads of a pad portion in a ratio of M:1, wherein M is a positive integer greater than 2.

20. The display device of claim 19, wherein the pad portion is disposed in the sub-area, and wherein the multiplexer is closer to the first area than the pad portion.

* * * * *